(12) United States Patent
Figueroa et al.

(10) Patent No.: US 12,184,769 B2
(45) Date of Patent: Dec. 31, 2024

(54) QUANTUM NETWORK DEVICES, SYSTEMS, AND METHODS

(71) Applicants: THE RESEARCH FOUNDATION FOR THE STATE UNIVERSITY OF NEW YORK, Albany, NY (US); QUNNECT, INC., Brooklyn, NY (US)

(72) Inventors: Eden Figueroa, Setauket, NY (US); Mehdi Namazi, Brooklyn, NY (US); Mael Flament, Port Jefferson, NY (US); Sonali Gera, Port Jefferson, NY (US)

(73) Assignees: The Research Foundation for The State University of New York, Albany, NY (US); Qunnect, Inc., Brooklyn, NY (US)

( * ) Notice: Subject to any disclaimer, the term of this patent is extended or adjusted under 35 U.S.C. 154(b) by 0 days.

(21) Appl. No.: 18/243,799

(22) Filed: Sep. 8, 2023

(65) Prior Publication Data
US 2023/0421367 A1  Dec. 28, 2023

Related U.S. Application Data

(62) Division of application No. 17/061,376, filed on Oct. 1, 2020, now Pat. No. 11,784,806.

(Continued)

(51) Int. Cl.
*H04L 9/08* (2006.01)
*G01B 9/02017* (2022.01)
*H04B 10/70* (2013.01)

(52) U.S. Cl.
CPC ........ *H04L 9/0858* (2013.01); *G01B 9/02017* (2013.01); *H04B 10/70* (2013.01); *H04L 9/0855* (2013.01)

(58) Field of Classification Search
CPC . H04L 9/0858; H04L 9/0855; G01B 9/02017; H04B 10/70; G06N 10/70
See application file for complete search history.

(56) References Cited

U.S. PATENT DOCUMENTS

| 5,243,649 A | 9/1993 | Franson |
| 6,678,450 B1 | 1/2004 | Franson |

(Continued)

FOREIGN PATENT DOCUMENTS

| CN | 206820763 U | 12/2017 |
| CN | 109039589 A | 12/2018 |

(Continued)

OTHER PUBLICATIONS

Faruque et al.; "On-chip quantum interference with heralded photons from two independent micro-ring resonator sources in silicon photonics", 2018, Optics Express, vol. 26, No. 16, pp. 20379-20395. (Year: 2018).*

(Continued)

*Primary Examiner* — Matthew Smithers
(74) *Attorney, Agent, or Firm* — Scully, Scott, Murphy & Presser, P.C.

(57) ABSTRACT

Quantum network devices, systems, and methods are provided to enable long-distance transmission of quantum bits (qubits) for applications such as Quantum Key Distribution (QKD), entanglement distribution, and other quantum communication applications. Such systems and methods provide for separately storing first, second, third, and fourth photons, wherein the first and second photons and the third and fourth photons are respective first and second entangled photon pairs, triggering a synchronized retrieval of the stored first, second, third, and fourth photons such that the first photon is propagated to a first node, the second and third photons are propagated to a second node, and the fourth photon is propagated to a third node, and creating a new entangled pair (Continued)

comprising the first and fourth photons at the first and third nodes to transmit quantum information.

3 Claims, 20 Drawing Sheets

Related U.S. Application Data

(60) Provisional application No. 62/909,515, filed on Oct. 2, 2019.

(56) References Cited

U.S. PATENT DOCUMENTS

| | | |
|---|---|---|
| 6,801,626 B1 | 10/2004 | Nambu |
| 6,897,434 B1 | 5/2005 | Kumar et al. |
| 7,220,954 B2 | 5/2007 | Kuzmich et al. |
| 7,489,436 B1 | 2/2009 | Fiorentino et al. |
| 7,518,120 B2 | 4/2009 | Monroe et al. |
| 7,536,012 B1 | 5/2009 | Meyers et al. |
| 7,539,308 B2 | 5/2009 | Conti et al. |
| 7,627,126 B1 | 12/2009 | Pikalo et al. |
| 7,667,995 B1 | 2/2010 | Leuenberger et al. |
| 7,812,303 B2 | 10/2010 | Meyers et al. |
| 7,831,048 B2 | 11/2010 | Kastella et al. |
| 7,847,234 B2 | 12/2010 | Meyers et al. |
| 8,103,172 B2 | 1/2012 | Peters et al. |
| 8,135,276 B2 | 3/2012 | Munro et al. |
| 8,294,967 B2 | 10/2012 | Langford et al. |
| 8,311,221 B2 | 11/2012 | Brodsky et al. |
| 8,670,672 B2 | 3/2014 | Stevenson et al. |
| 8,923,517 B2 | 12/2014 | Arahira |
| 8,983,303 B2 | 3/2015 | Meyers et al. |
| 9,111,229 B2 | 8/2015 | Harrison et al. |
| 9,131,128 B2 | 9/2015 | Meyers et al. |
| 9,235,101 B2 | 1/2016 | Silverstone et al. |
| 9,264,226 B2 | 2/2016 | Harrison et al. |
| 9,270,385 B2 | 2/2016 | Meyers et al. |
| 9,294,191 B2 | 3/2016 | Peters et al. |
| 9,304,371 B2 | 4/2016 | Stevenson et al. |
| 9,313,180 B1 | 4/2016 | Gray et al. |
| 9,331,843 B2 | 5/2016 | Silverman et al. |
| 9,378,542 B2 | 6/2016 | Meyers et al. |
| 9,720,437 B2 | 8/2017 | Gilbert et al. |
| 9,851,742 B2 | 12/2017 | Gilbert et al. |
| 10,168,501 B2 | 1/2019 | Ashrafi |
| 10,361,848 B2 | 7/2019 | Gray et al. |
| 10,379,420 B1 | 8/2019 | Wang |
| 10,439,737 B2 | 10/2019 | Hughes et al. |
| 10,855,457 B1 | 12/2020 | Vakili |
| 10,902,338 B2 | 1/2021 | Monroe et al. |
| 10,924,191 B2 | 2/2021 | Crowder et al. |
| 10,951,326 B1 | 3/2021 | Reilly |
| 10,992,391 B1 | 4/2021 | Meyers et al. |
| 11,050,559 B2 | 6/2021 | Bucklew et al. |
| 11,126,062 B1 | 9/2021 | Kieling et al. |
| 11,163,535 B1 | 11/2021 | Vakili |
| 11,170,318 B2 | 11/2021 | Ashrafi |
| 11,218,471 B1 | 1/2022 | Stapleton et al. |
| 11,240,013 B1 | 2/2022 | Vakili |
| 11,240,223 B1 | 2/2022 | Stapleton et al. |
| 11,245,519 B1 | 2/2022 | Stapleton, Jr. et al. |
| 11,251,952 B2 | 2/2022 | Lamas-Linares et al. |
| 11,290,192 B2 | 3/2022 | Kaliteevskiy et al. |
| 11,308,416 B2 | 4/2022 | Pant et al. |
| 11,328,216 B2 | 5/2022 | Monroe et al. |
| 11,356,247 B1 | 6/2022 | Carter, Jr. et al. |
| 11,387,913 B2 | 7/2022 | Innes |
| 11,424,835 B2 | 8/2022 | Huberman et al. |
| 11,475,347 B1 | 10/2022 | Rudolph et al. |
| 11,601,266 B1 | 3/2023 | Stapleton et al. |
| 11,663,510 B1 | 5/2023 | Carter, Jr. et al. |
| 11,888,978 B1 | 1/2024 | Wang et al. |
| 11,895,232 B1 | 2/2024 | Stapleton et al. |
| 2002/0030186 A1 | 3/2002 | Tomita |
| 2004/0258421 A1 | 12/2004 | Conti et al. |
| 2007/0110242 A1* | 5/2007 | Tomita ............... H04L 9/0858 356/453 |
| 2008/0075410 A1 | 3/2008 | Spillane et al. |
| 2008/0089696 A1 | 4/2008 | Furuta |
| 2008/0258049 A1 | 10/2008 | Kuzmich et al. |
| 2009/0016386 A1 | 1/2009 | Edamatsu et al. |
| 2010/0027794 A1* | 2/2010 | Yuan ..................... H04L 9/002 380/278 |
| 2010/0111541 A1 | 5/2010 | Trojek et al. |
| 2011/0242632 A1 | 10/2011 | Bennett et al. |
| 2013/0301094 A1 | 11/2013 | Gilbert et al. |
| 2013/0308956 A1 | 11/2013 | Meyers et al. |
| 2014/0341575 A1 | 11/2014 | Choi et al. |
| 2014/0355998 A1 | 12/2014 | Tanzilli et al. |
| 2015/0055961 A1 | 2/2015 | Meyers et al. |
| 2015/0295707 A1 | 10/2015 | Howe et al. |
| 2015/0295708 A1 | 10/2015 | Howe et al. |
| 2016/0047643 A1* | 2/2016 | Yuan ................... H01S 5/4006 398/25 |
| 2017/0026095 A1 | 1/2017 | Ashrafi et al. |
| 2018/0069631 A1 | 3/2018 | Ashrafi |
| 2019/0109651 A1 | 4/2019 | Su et al. |
| 2019/0305942 A1 | 10/2019 | Cambou |
| 2020/0244373 A1 | 7/2020 | Huberman et al. |
| 2020/0382219 A1 | 12/2020 | Innes et al. |
| 2021/0028865 A1 | 1/2021 | Figueroa et al. |
| 2021/0133614 A1 | 5/2021 | Ashrafi |
| 2021/0176055 A1 | 6/2021 | Rahman et al. |
| 2021/0295196 A1 | 9/2021 | Gimeno-Segovia |
| 2022/0075237 A1 | 3/2022 | Mittal et al. |
| 2022/0303022 A1 | 9/2022 | Kaliteevskiy et al. |
| 2022/0303023 A1 | 9/2022 | Innes |
| 2023/0006719 A1 | 1/2023 | Ashrafi et al. |
| 2023/0393335 A1 | 12/2023 | Challener et al. |
| 2023/0421367 A1 | 12/2023 | Figueroa et al. |
| 2024/0115222 A1 | 4/2024 | Ken et al. |

FOREIGN PATENT DOCUMENTS

| | | |
|---|---|---|
| CN | 109547144 A | 3/2019 |
| CN | 209517161 U | 10/2019 |
| CN | 110868293 A | 3/2020 |
| CN | 109217938 B | 4/2020 |
| CN | 210839597 U | 6/2020 |
| CN | 211352207 U | 8/2020 |
| CN | 110870251 B | 4/2023 |
| CN | 111162866 B | 7/2023 |
| CN | 116663668 A | 8/2023 |
| CN | 111147243 B | 2/2024 |
| CN | 111082876 B | 4/2024 |
| EP | 1882331 B1 | 7/2012 |
| EP | 3111380 B1 | 9/2019 |
| GB | 2529228 A | 2/2016 |
| IN | 201837045351 A | 2/2019 |
| JP | 2003037559 A | 2/2003 |
| JP | 2009526474 A | 7/2009 |
| JP | 4784202 B2 | 10/2011 |
| JP | 2012004955 A | 1/2012 |
| JP | 2012004956 A | 1/2012 |
| JP | 5014844 B2 | 8/2012 |
| JP | 2013506373 A | 2/2013 |
| JP | 5638249 B2 | 12/2014 |
| JP | 2014225865 A | 12/2014 |
| JP | 2016042694 A | 3/2016 |
| JP | 2016144206 A | 8/2016 |
| JP | 2016154324 A | 8/2016 |
| JP | 2018505599 A | 2/2018 |
| JP | 6324942 B2 | 5/2018 |
| JP | 2018513622 A | 5/2018 |
| JP | 2019524015 A | 8/2019 |
| JP | 2019537863 A | 12/2019 |
| JP | 7108296 B2 | 7/2022 |
| KR | 20190077376 A | 7/2019 |
| KR | 20230007456 A | 1/2023 |
| RU | 2661287 C1 | 7/2018 |
| WO | 1999056392 A2 | 11/1999 |
| WO | 2005008953 A1 | 1/2005 |
| WO | 2005029404 A2 | 3/2005 |

(56) References Cited

FOREIGN PATENT DOCUMENTS

| WO | 2006124208 A1 | 11/2006 |
| WO | 2009079759 A1 | 7/2009 |
| WO | 2011032825 A1 | 3/2011 |
| WO | 2019144319 A1 | 8/2019 |
| WO | 2020211950 A1 | 10/2020 |
| WO | 2021136165 A1 | 7/2021 |

OTHER PUBLICATIONS

Invitation to Pay Additional Fees mailed Jan. 5, 2021 in connection with International Application No. PCT/US2020/053855.
International Search Report and Written Opinion mailed Mar. 12, 2021 in connection with International Application No. PCT/US2020/053855.
Liu et al., Semihierarchical quantum repeaters based on moderate lifetime quantum memories. arXiy:I 701.05718YI. Jan. 20, 2017, 8 pages.
Scherer et al.; "Quantum states prepared by realistic entanglement swapping", 2010, arXiv:0904.1184v2, pp. 1-44.
Liu et al.; "Semihierarchial quantum repeaters based in moderate lifetime quantum memories" 2017, Physical Review A 95, 012319, 2018, pp. 1-7.

* cited by examiner

QUANTUM NETWORK DEVICES, SYSTEMS, AND METHODS

RELATED APPLICATIONS

This Application is a divisional of U.S. patent application Ser. No. 17/061,376 filed on Oct. 1, 2020, which claims priority under 35 § USC 119 (e) to U.S. Provisional Patent Application Ser. No. 62/909,515, filed Oct. 2, 2019, entitled "QUANTUM NETWORK DEVICES, SYSTEMS, AND METHODS" which is hereby incorporated herein by reference in its entirety.

FIELD

The present disclosure relates to quantum network devices, systems, and methods such as, for use in quantum key distribution, quantum entanglement distribution, and/or other quantum communication applications.

BACKGROUND

Quantum communication technologies can revolutionize the telecommunication industry, e.g., the storage, the transmission, and the processing of information, because of their ability to enable fully-secured communications. Contrary to current cryptographic techniques, which are mostly based on unidirectional mathematical functions, quantum communication is based on the physical laws of nature, e.g., quantum physics. The principles of quantum physics enable the creation of fundamentally secure quantum communication techniques such as, for example, Quantum Key Distribution (QKD). QKD is a secure communication technique where any attempt by an eavesdropper to intercept a communication of the secure key introduces anomalies that can be detected by the communicating parties. These anomalies result from an essential aspect of quantum mechanics; the process of measuring a quantum system necessarily disturbs the system.

Despite the significant advantage of being able to provide inherently secured communications, quantum communication techniques are not ubiquitous. This is due, in part, to the difficulties of counteracting transmission loss in fibers and storing (or buffering) the quantum information.

SUMMARY

The present disclosure provides quantum network devices, systems, and methods. These devices, systems, and methods enable long-distance transmission of quantum bits (qubits) for applications such as Quantum Key Distribution (QKD), entanglement distribution, and other quantum communication applications.

Aspects and features of the present disclosure are detailed below. To the extent consistent, any of the aspects and features of the present disclosure may be utilized in conjunction with (or without) any of the other aspects and features of the present disclosure.

Provided in accordance with aspects of the present disclosure is a method including separately storing, while maintaining quantum integrity, first, second, third, and fourth photons. The first and second photons and the third and fourth photons are respective first and second entangled photon pairs. The method further includes triggering a synchronized retrieval of the stored first, second, third, and fourth photons such that the first photon is propagated to a first node, the second and third photons are propagated to a second node, and the fourth photon is propagated to a third node. Quantum features of the second and third photons are simultaneously measured at the second node such that a new entangled pair including the first and fourth photons disposed at the first and third nodes, respectively, is created.

The synchronization and entanglement swapping provided in accordance with the present disclosure can, in aspects, be done regardless of the transmission length (e.g., fiber length) each of the photons travels through as long as no photon goes through a transmission length (e.g., fiber length) that could result in a HOM visibility depth below usability, e.g., less than 40% (although other HOM visibility thresholds are also contemplated). The storage and synchronized retrieval, in aspects, may be performed by quantum memory devices, e.g., those provided in accordance with the present disclosure, that can compensate for the path differences by converting path differences into storage time differences.

In an aspect of the present disclosure, separately storing the photons includes separately storing the first, second, third, and fourth photons in respective first, second third, and fourth quantum memories.

In another aspect of the present disclosure, the second node is an intermediate node.

In another aspect of the present disclosure, the intermediate node is a Bell-state measurement node.

In still another aspect of the present disclosure, the quantum feature includes polarization.

In yet another aspect of the present disclosure, at least one of the first or third nodes is an end node. Additionally or alternatively, the second node includes a plurality of second nodes.

In still yet another aspect of the present disclosure, at least one of the first or third nodes includes a random polarization generator node. Other suitable first and/or third nodes are also contemplated.

In another aspect of the present disclosure, prior to separately storing the photons, the method includes producing the first and second entangled photon pairs at respective first and second entanglement photon sources.

A method of checking a quantum network in accordance with the present disclosure includes measuring classical first-order interference between two temporally synchronized photon pulses received from separate sources. Each pulse includes, on average, a plurality of photons. The method further includes determining an interference visibility based on the measured classical first-order interference and determining whether the interference visibility is above a threshold. In aspects, the threshold is at least 95%.

In an aspect of the present disclosure, in response to determining that the classical interference visibility is not above the threshold, the method further includes providing a negative indication such as, for example, transmitting a classical signal indicating a failed test. Alternatively or additionally, in response to determining that the classical interference visibility is above the threshold, the method further includes providing a positive indication such as, for example, transmitting a classical signal indicating a passed test.

Another method of checking a quantum network in accordance with the present disclosure includes measuring Hong-Ou-Mandel (HOM) interference between two temporally synchronized photon pulses received from separate sources. Each photon pulse includes, on average, one photon or less. The method further includes determining an interference visibility based on the measured HOM interference, and determining whether the interference visibility is above a threshold. In aspects, the threshold is at least 40%; in other aspects, the threshold is at least 42%; in still other aspects, the threshold is at least 44%; in other aspects, the threshold is at least 46%; or in yet other aspects, the threshold is at least 48%.

In an aspect of the present disclosure, in response to determining that the HOM interference visibility is not above the threshold, the method further includes providing a negative indication such as, for example, transmitting a classical signal indicating a failed test. Alternatively or additionally, in response to determining that the HOM interference visibility is above the threshold, the method further includes providing a positive indication such as, for example, transmitting a classical signal indicating a passed test.

In another method of the present disclosure, the above-detailed classical first-order interference check may be performed to determine a classical interference visibility based on the measured classical first order interference. In response to determining that the classical interference visibility is above a first threshold, the method further includes performing the above-detailed HOM interference check to determine a HOM interference visibility and determine whether the HOM interference visibility is above a HOM interference threshold.

In an aspect of the present disclosure, in response to determining that the classical interference visibility is not above the first threshold, a negative indication is provided. In response to determining that the HOM interference visibility is not above the second threshold, a negative indication is provided. In response to determining that both the classical and HOM interference visibilities are above the respective first and second thresholds, a positive indication is provided.

An on-demand photon source provided in accordance with the present disclosure includes an entanglement photon source configured to output first and second entangled photons, respectively, at a first frequency. The source further includes a first quantum memory device configured to receive and store the first entangled photon, a second quantum memory device configured to receive and store the second entangled photon, and a controller configured to direct the first and second quantum memory devices to output (e.g., to direct retrieval), in temporal synchronization, the respective first and second stored and entangled photons at a second frequency different from the first frequency.

In an aspect of the present disclosure, the first frequency is compatible with telecommunication optical fiber transmission.

In another aspect of the present disclosure, at least one of the first or second quantum memory devices is configured to perform frequency conversion from the first frequency to a second frequency.

In yet another aspect of the present disclosure, the second frequency is a frequency enabling quantum memory storage.

A quantum system in accordance with the present disclosure includes a first node, a second node, and a transmission channel defined between the first and second nodes. The transmission channel includes at least one multiplexer and at least one demultiplexer. The at least one multiplexer is configured to receive at least one quantum signal and a plurality of classical signals, combine the at least one quantum signal and the plurality of classical signals, and output the combined signals for propagation through the transmission channel. The at least one demultiplexer is configured to receive the propagated combined signals and demultiplex the propagated combined signals into the at least one quantum signal and the plurality of classical signals. In other aspects, the at least one quantum signal and at least one of the plurality of classical signals are counter-propagated through the transmission channel.

In an aspect of the present disclosure, a quantum memory device is disposed upstream of the multiplexer and configured to store the at least one quantum signal. Alternatively or additionally, a quantum memory device is disposed downstream of the demultiplexer and configured to store the at least one quantum signal.

In another aspect of the present disclosure, the plurality of classical signals includes at least one of an incoming signal, a transmission signal, a receiving signal, a temporal synchronization signal, or a line status signal. Additional or alternative signals are also contemplated.

Yet another method provided in accordance with the present disclosure includes receiving, at a multiplexer, a quantum signal and a plurality of classical signals. The method further includes combining, via the multiplexer, the quantum signal and the plurality of classical signals and outputting, from the multiplexer, the combined signals. The combined signals are propagated through a transmission channel and received at a demultiplexer. The method further includes separating, via the demultiplexer, the combined signals into the quantum signal and the plurality of classical signals and outputting, from the demultiplexer, the quantum signal and the plurality of classical signals.

In an aspect of the present disclosure, the method further includes storing the quantum signal after the outputting from the demultiplexer and/or storing the quantum signal before the receiving at the multiplexer.

In another aspect of the present disclosure, the at least one quantum signal and at least one of the plurality of classical signals are counter-propagated.

A method provided in accordance with the present disclosure includes receiving a cryptographic key encoded as a sequence of binary digits, converting the cryptographic key to a quantum key encoded as a sequence of qubits, and transmitting the quantum key to a quantum repeater. The quantum repeater transfers the property of entanglement between two generated pairs of photons. The method further includes storing the quantum key in a quantum memory device at room temperature, retrieving the quantum key from the quantum memory device, converting the quantum key to the cryptographic key, and transmitting the cryptographic key.

In an aspect of the present disclosure, the quantum key is stored in the quantum memory device as polarized photons.

In another aspect of the present disclosure, the cryptographic key and the quantum key are transmitted over a fiber optic cable.

In another aspect of the present disclosure, the quantum key is transmitted as polarized photons in free space.

In still another aspect of the present disclosure, the quantum memory device converts a wavelength of at least one of the two generated pairs of photons.

In yet another aspect of the present disclosure, retrieving the quantum key from the quantum memory device retains the integrity of the cryptographic key.

In still yet another aspect of the present disclosure, the method further includes converting the cryptographic key from a sequence of qubits to a sequence of binary digits. The method may also include receiving encrypted data and decrypting the encrypted data based at least in part on the cryptographic key.

BRIEF DESCRIPTION OF THE DRAWINGS

Various aspects and features of the present disclosure are described hereinbelow with reference to the drawings wherein like numerals designate similar elements in each of the several views and:

FIGS. 4C-1 and 4C-2 are exemplary graphical representations showing transition levels of Rubidium atoms and the diamond scheme enabling use of these transition levels to achieve QFC with Rubidium atoms;

DETAILED DESCRIPTION

Figure 1:
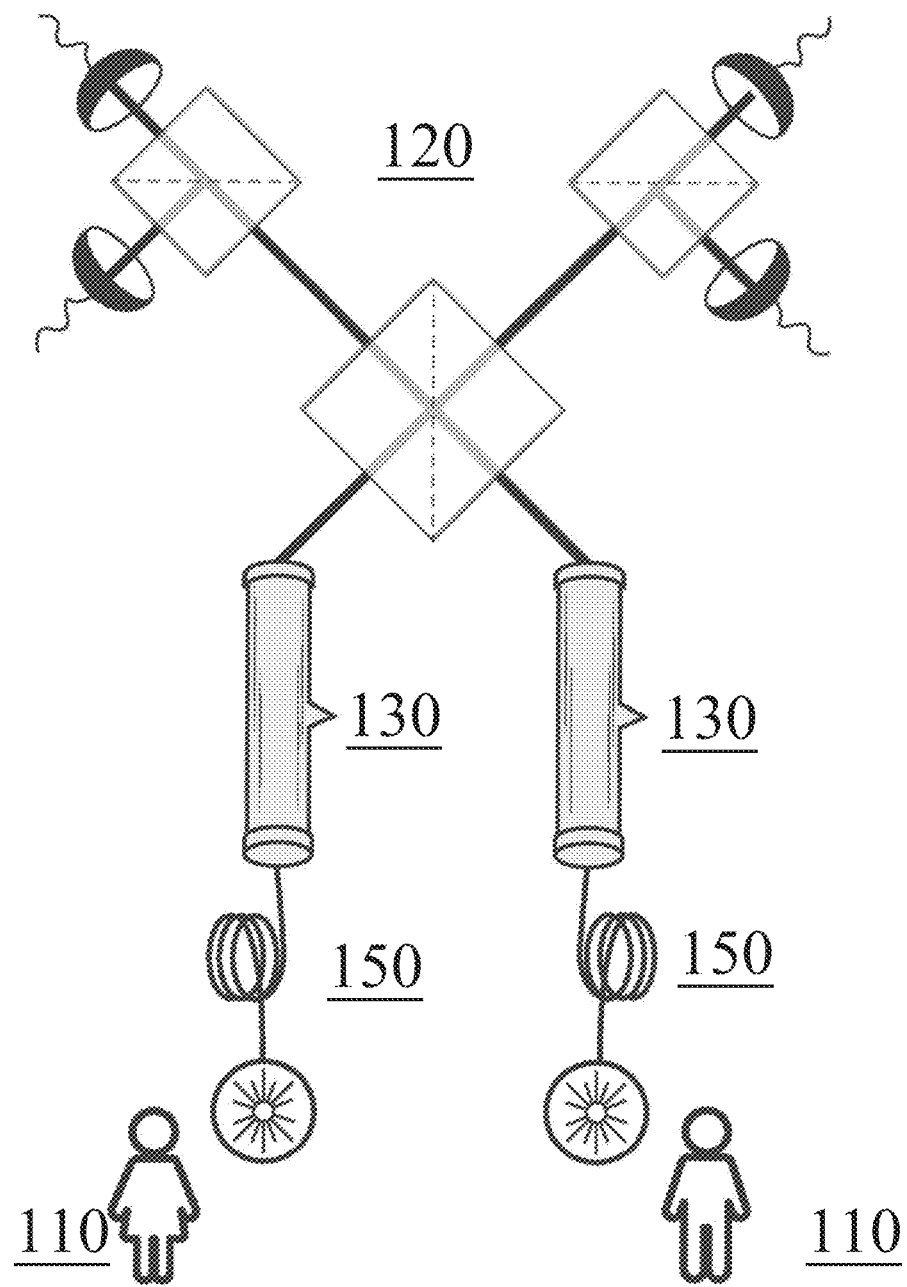
FIG. 1 is a simplified schematic diagram of a quantum network in a memory-assisted quantum interference measuring configuration in accordance with the present disclosure.

The following detailed description is made with reference to the accompanying drawings, wherein explanations regarding components, functions, or constructions known in the art are summarily provided or omitted entirely in an effort to avoid obscuring the aspects and features of the present disclosure with unnecessary details.

Implementation of a long-distance quantum communication network requires, as noted above, counteracting transmission loss in optical fibers and/or free space transmission loss. More specifically, when transmission of optical signals over long-distances is required, measures must be taken to counteract the unavoidable losses (e.g., attenuation, dispersion) of the transmitted signal. With respect to traditional communications, a signal repeater receives, amplifies (or replicates), and forwards the signal. However, for quantum communications, this cannot be accomplished in the same manner as traditional communications; rather, the solution of a quantum repeater is not so simple. The same fundamental physics principle that protects against eavesdroppers also prevents the direct amplification and/or replication of quantum information (qubits). This concept is described by the no-cloning theorem. (See M. A. Nielsen and I. L. Chuang, Quantum Computation and Quantum Information, 10th ed. Cambridge University Press, 2011.)

Quantum teleportation provides an invaluable strategy for transmitting qubits without either the physical transfer of the particle storing the qubit or the violation of the quantum mechanics principles. By implementing a Bell-state Measurement (BSM) on an entangled photon (qubit) pair shared between nodes, quantum teleportation allows a quantum communication system to "transmit" an unknown quantum state between two remote quantum devices.

Quantum repeaters leverage teleportation to provide an analogue to classical repeaters. Quantum repeaters use the physics of teleportation, leveraging a process called entanglement swapping to allow for transmission of the quantum information via teleportation of an entangled photon (qubit) pair beyond the quantum state coherence length of a standard transmission channel. Entanglement swapping can be accomplished with at least one entanglement source transmitting the state to the two distant nodes. If the network architecture allows for multiple entanglement sources between the distant nodes, entanglement swapping between the most distant nodes can be accomplished with significantly reduced signal loss when compared to transmission through standard fiber optic channels. In embodiments, through the use of quantum memory devices incorporated into a network, the various entanglement swaps in the network can be done independently of one another.

The present disclosure provides quantum repeaters leveraging quantum teleportation, systems (e.g., networks) incorporating the same, quantum repeater methods, and other devices, systems, and methods that overcome the above challenges to enable long-distances transmission of quantum information via a quantum network. In embodiments, each transmission channel in the quantum systems (e.g., networks) includes a quantum channel portion to generate entanglement and enable entanglement swapping to achieve quantum teleportation, and a classical channel portion to transmit control information in a conventional manner.

Implementation of a quantum communication network also requires, as noted above, storing (or buffering) the quantum information. This can be accomplished using a quantum memory device, a non-limiting example of which is detailed below. However, other suitable quantum memory devices are also contemplated.

Figure 2:
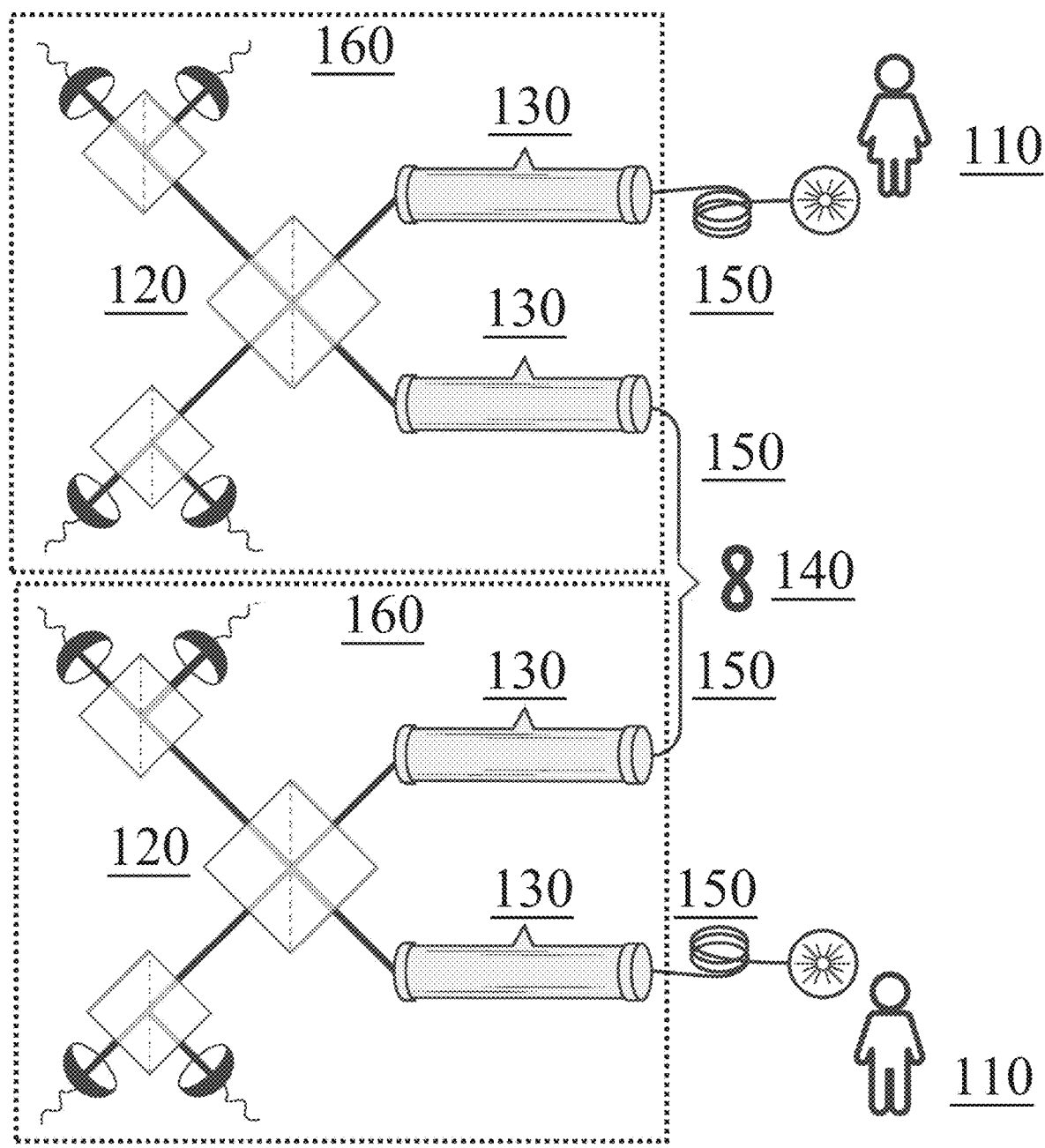
FIG. 2 is a simplified schematic diagram of a quantum network in an entanglement-assisted, memory-assisted quantum interference measuring configuration in accordance with the present disclosure.

Referring to FIGS. 1 and 2, FIG. 1 illustrates an exemplary quantum network 10 in a memory-assisted quantum interference measuring configuration and FIG. 2 illustrates an exemplary quantum network 20 in an entanglement-assisted, memory-assisted quantum interference measuring configuration. Quantum networks 10, 20 may be implemented, for example and without limitation, for use in quantum cryptography applications including Quantum Key Distribution (QKD), e.g., as a Memory-Assisted, Measurement Device Independent QKD (MA-MDI-QKD) quantum network or an Entanglement-Assisted MA-MDI-QKD (EA-MA-MDI-QKD) network, or for other purposes that require, or take advantage of, quantum entanglement distribution. Such an implementation is detailed below with reference to FIG. 12A, although other implementations are also contemplated.

Each network 10, 20 includes a plurality of nodes such as, for example, first and second end nodes 110 and one or more intermediate nodes 120. Each network 10, 20 further includes at least two quantum memory/buffer devices 130. As illustrated in FIG. 1, network 10, more specifically, includes first and second end nodes 110 each coupled to an intermediate node 120 with a quantum memory device 130 disposed in the transmission channel 150 between each of the first end node 110 and the intermediate node 120 and the second end node 110 and the intermediate node 120.

Network 20, more specifically, as illustrated in FIG. 2, includes two end nodes 110, four quantum memory devices 130, two intermediate nodes 120, and an entanglement photon-pair source node 140. A transmission channel 150 is defined between each end node 110 and a corresponding intermediate node 120 with a quantum memory device 130 disposed therebetween, and another transmission channel 150 is defined between the entanglement photon source node 140 and each of the intermediate nodes 120 with a quantum memory device 130 disposed therebetween. The transmission channel can be either through fiber or free-space. As detailed below, the location of the quantum memory device 130 along a particular transmission channel 150 may vary depending upon the particular configuration of the network, the features of the components interconnected by the transmission channel 150, or other factors and may include, without limitation, an end of the transmission channel 150 or any other location along the transmission channel 150.

Either or both of the end nodes 110 may include a quantum random polarization (or other quantum feature, e.g., spin) generator for photons; the layout of an exemplary end node 110 is described in greater detail below with reference to FIG. 7.

One or more of the intermediate nodes 120 includes a polarization (or other quantum feature) decoding module, e.g., a Bell-State Measurement (BSM) station, and is described in greater detail below with reference to FIG. 5.

Each of the quantum memory devices 130 is capable of temporally storing quantum information, e.g., qubits, acting like a programmable buffer, facilitating synchronization within a quantum network by storing photons and retrieving them on demand with high-fidelity, in a deterministic manner. Depending on the network configuration, the quantum memory devices 130 and/or nodes 110, 120 can be used in different ways, for example, at the measurement stations the quantum memory devices 130 can be utilized to guarantee that photons are synchronized whereas at the sources the quantum memory devices 130 can be utilized to create a deterministic on-demand photon source.

Each transmission channel 150 is configured to enable transmission, e.g., through one or more optical fibers, in free space, in combinations thereof, etc., of quantum information (e.g., photons encoding information) and, in embodiments to also enable transmission of classical information (e.g., a digital signal containing information). Embodiments of transmission channels 150 are detailed below with reference to FIGS. 8 and 9.

Each entanglement photon source node 140 may be a parametric down conversion entanglement photon source (which converts a photon of higher energy into a pair of photons of lower energy) or other suitable photon source capable of producing a pair of polarization (or other quantum feature) entanglement at the proper wavelengths, and within a determined bandwidth. Polarization entanglement may be achieved, for example, via satisfying the simultaneous resonant condition for both H (horizontally) and V (vertically) polarized photons by placing and tuning two Periodically Poled Potassium Titanyl Phosphate (PPKTP) crystals in an amplification cavity. High-repetition polarization entangled-states can be created by pulsing the pump laser and improvements to the entanglement generation rate can be achieved by optimizing the reflectivity of the out-coupling mirror in the Optical Parametric Amplifier (OPA) cavity to find a compromise between finesse (the ratio of Free Spectral Range (FSR) over the half-width of the transmitted frequency band) and cavity output. The production of Spontaneous Parametric Down-Conversion (SPDC) photon pairs are efficiently matched to the main mode of the cavity in real time, thereby achieving maximum finesse square enhancement setup. This configuration readily enables conversion from a Discrete-Variable (DV) quantum source to a Continuous-Variable (CV) quantum source by exchanging the PPKTP non-linear crystals. Further, this configuration enables generation of squeezed light tuned to atomic lines or Schrödinger kitten states by combination with single photon subtraction.

Although embodiments of end nodes 110, intermediate nodes 120, quantum memory devices 130, entanglement photon sources node 140, and transmission channels 150 are detailed herein it is contemplated that any suitable components or portions thereof may be additionally or alternatively utilized, duplicated, etc., to create a desired quantum network configuration.

With reference to FIG. 1, in use, generally, end nodes 110 both encode and/or decode their information on the single photon level pulses in the form of polarization, whether randomly for QKD applications or deterministically for other use cases, and transmit them along respective transmission channels 150 to intermediate node 120. A quantum memory device 130 may be disposed at different physical locations in each transmission channel 150 to store the polarization qubits and enable selective retrieval to coordinate arrival of the polarization qubits at the intermediate measurement node 120 in temporal synchronization. Regardless of their positions, the quantum memory devices 130 of the present disclosure store qubits while maintaining the integrity thereof; that is, the quantum memory devices 130 enable retrieval of the qubits without damaging the quantum information encoded thereon, e.g., polarization.

The intermediate node 120 may be configured as a Bell-state measurement station which interferes the two qubits and performs a Bell-state measurement to determine whether the two-qubit state is an entangled state. If the Bell-state measurement is successful (e.g., it detects entanglement), then the end nodes 110 can establish a quantum correlation between the qubits they sent. An eavesdropper attempting to intercept the qubits may not reconstruct the qubit sequence of the end nodes 110 from the Bell-state measurement results, and therefore intermediate node 120 can communicate the coincidence detections classically to the end nodes 110. The qubits may be single photons encoded with quantum information in their quantum feature, e.g., polarization.

Figure 5:
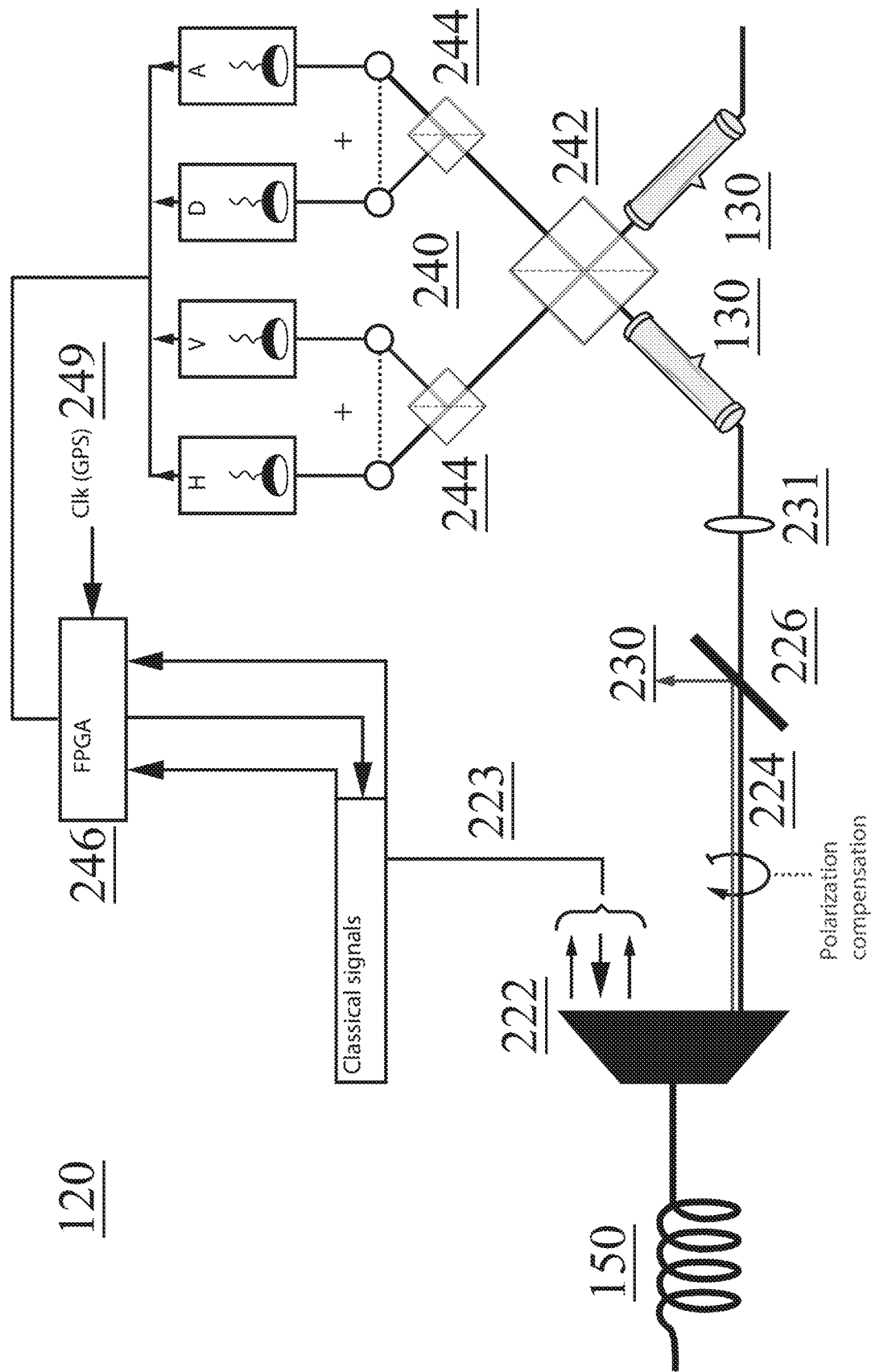
FIG. 5 is an enlarged, more detailed schematic diagram of an intermediate node of a quantum network in accordance with the present disclosure including both classical and quantum signals.

The Bell-state measurement station of the intermediate node 120, with momentary additional reference to FIG. 5, more specifically, includes a Non-Polarizing Beam Splitter (NPBS) at which the qubits retrieved from the quantum memory devices 130 interfere, and two single-photon detectors or Single-Photon Counting Modules (SPCMs) placed at the output arms of the NPBS to generate a signal every time they record a hit. Intermediate node 120 is described in greater detail below with reference to FIG. 5. This is sufficient to perform an HOM check detailed below. However, to extract the polarization information of transmitted qubits, a second set of polarizing beam splitters (PBS) is used sequentially in the optics path to the NPBS. More specifically, for a Hong-Ou-Mandel (HOM) interference check, as detailed below, the polarizations of Horizontal (H) and Vertical (V) can be summed and the polarizations of Diagonal (D) and Antidiagonal (A) can be summed such that only two detectors are required. However, to enable use of intermediate node 120 to both perform a HOM check and extract the polarization information of transmitted qubits, intermediate node 120 includes two sets of polarizing beam splitters (PBS) for a total of four (4), thus enabling detection of each of the H, V, D, and A polarizations.

With reference back to FIGS. 2, with respect to network 20, intermediate nodes 120 thereof function similarly as detailed above with respect to network 10 (FIG. 1) except that both photon(s) received at each intermediate node 120 are not provided by an end node 110. Rather, each end node 110 provides photon(s) to one of the intermediate nodes 120 via a transmission channel 150 while the other photon(s) provided to the intermediate nodes 120 are provided by an entanglement photon source node 140 via transmission channels 150. Entanglement photon source node 140 is configured to generate an entangled photon pair (in embodiments, pulses of entangled photon pairs) and output one photon of each pair along the different transmission channels 150 connected thereto. Quantum memory devices 130 are disposed in each of these transmission channels 150 as well as the transmission channels 150 between the end nodes 110 and the intermediate nodes 120 to coordinate arrival of the polarization qubits at the intermediate nodes 120 in temporal synchronization (thus accounting for asymmetrical transmission channels 150 and/or other temporal variations in the network).

Each intermediate node 120 includes a Bell-state measurement station and is capable of performing the coarse check and/or the fine check detailed below and also capable of extracting the polarization information of transmitted qubits. In fact, regardless of the number of nodes 110, 120 in a particular network, each intermediate node 120 is configured to perform a Bell-state measurement to extract the polarization information of transmitted qubits and determine whether the qubits received are in an entangled state. This is performed along the entire network whereby each intermediate node 120 shares a source, e.g., an end node 110 or an entanglement photon source node 140, with each adjacent intermediate node 120. This enables quantum teleportation, as detailed below, and also allows for the integrity of the entire network to be checked by performing the coarse and/or fine checks detailed below at each intermediate node 120.

Figure 3:
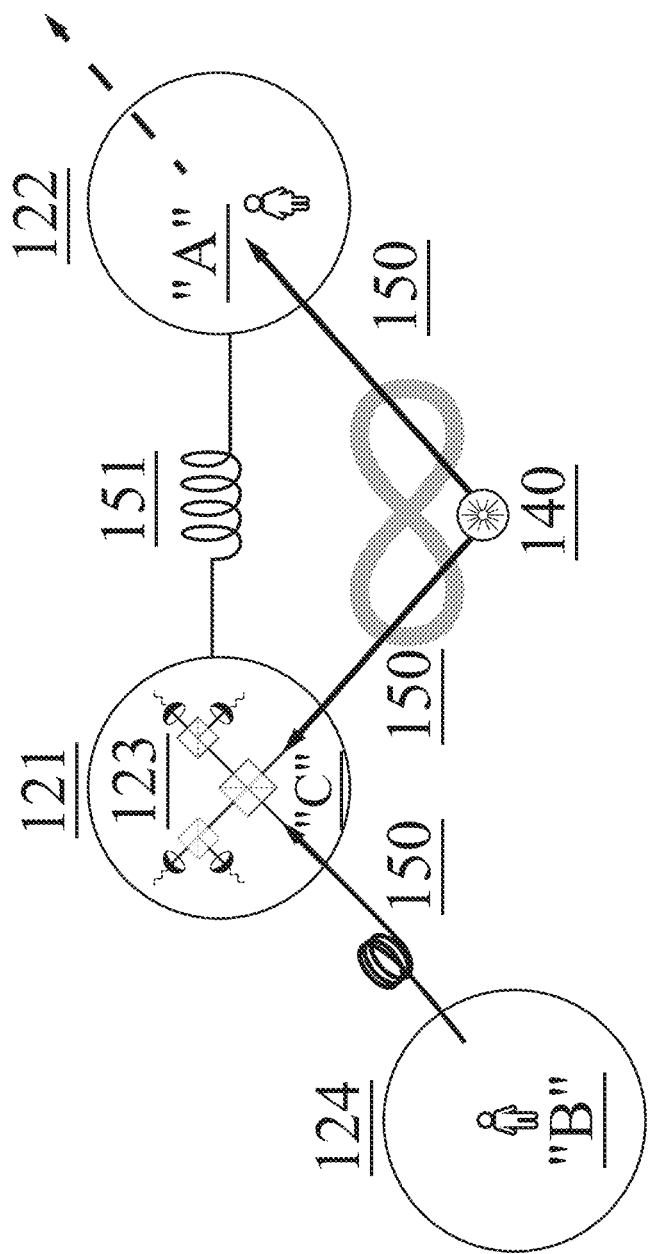
FIG. 3 is a schematic diagram illustrating the phenomenon of quantum teleportation.

With reference to FIG. 3, as noted above, the quantum networks of the present disclosure, e.g., network 20 (FIG. 2), leverage quantum entanglement swapping to allow for transmission of quantum information via teleportation of an entangled photon pair. More specifically, first and second photons (qubits) of an entangled photon pair created, for example, at an entanglement photon source node 140, are transmitted, e.g., via transmission channels 150, to different nodes, e.g., a "C" node 121 and an "A" node 122. The "C" node 121 may be an intermediate node including a Bell-state measurement station 123. The "A" node may likewise be an intermediate node, may be an end node, or may be any other node. The "C" and "A" nodes 121, 122 may communicate via a classical channel 151.

A "B" node 124, e.g., an end node, an entanglement photon source node, or any other suitable node, transmits a photon (qubit) encoded with quantum information, e.g., a polarization qubit, to the "C" node 121. Arrival of the photon (qubit) from the "B" node 124 and arrival of the first photon (qubit) of the entangled photon pair at the "C" node 121 is synchronized such that the Bell-state measurement station 123 of the "C" node 121 can perform a Bell-state measurement. By performing the Bell-state measurement of the photon (qubit) transmitted from the "B" node 124 and the first photon (qubit) of the entangled photon pair from the "D" or entanglement photon source node 140, entanglement swapping takes place whereby the quantum information encoded on the photon (qubit) from the "B" node 124 is teleported to the second photon (qubit) of the entangled photon pair received at the "A" node 122. That is, without physical transmission of a photon (qubit) from the "B" node 124 to the "A" node 122, the quantum information encoded on the photon (qubit) produced at the "B" node 124 is teleported to the "A" node 122.

Although the above details a single entanglement swap and corresponding teleportation from the "B" node 124 to the "A" node 122 with a single "C" node 121 therebetween, the network may be expanded and entanglement swapping performed sequentially therealong to teleport quantum information from one node to another with any number of intermediate nodes therebetween. Particular implementations, features, and configurations of such networks are detailed below.

Figure 4A:
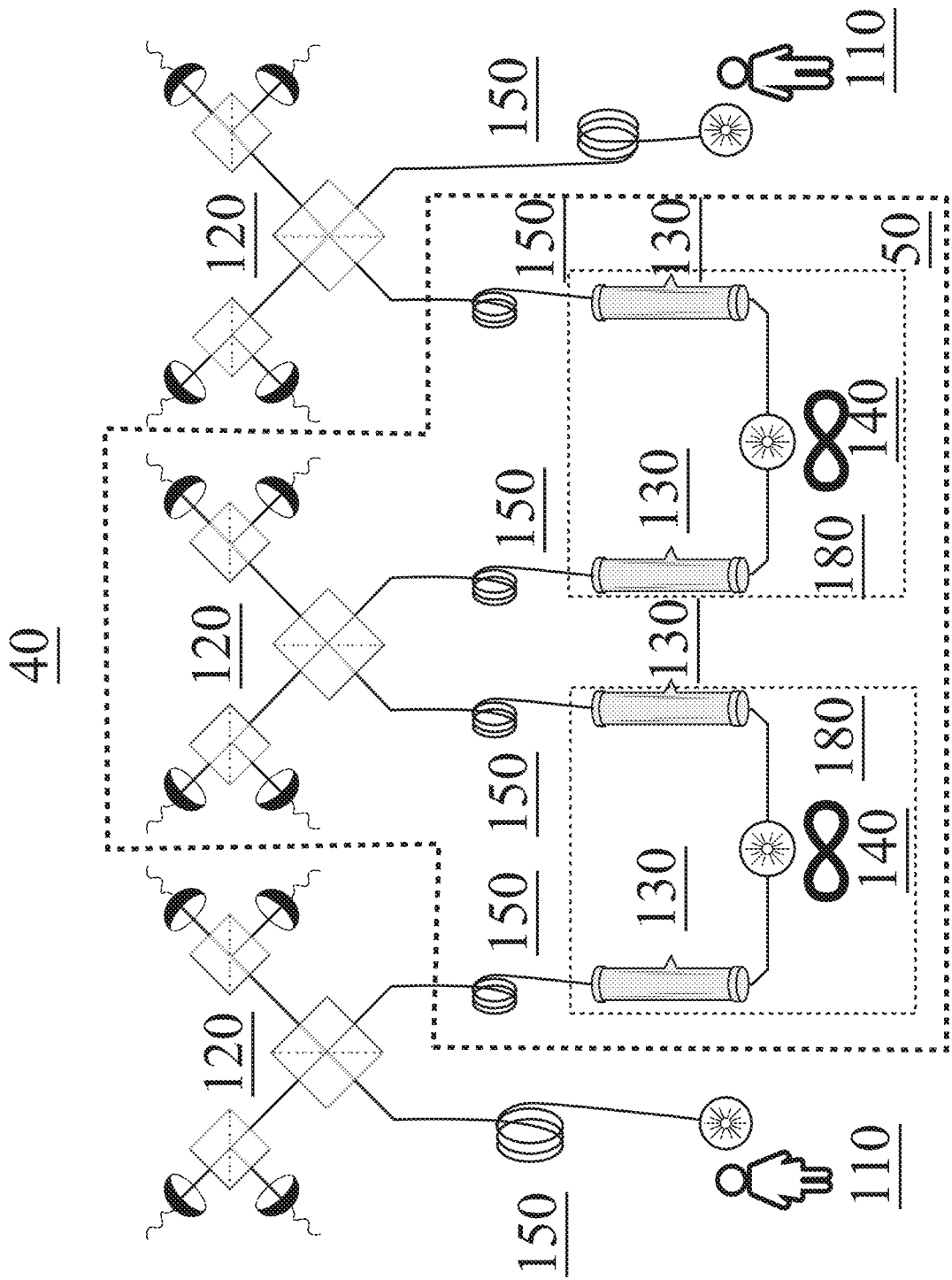
FIG. 4A is a simplified schematic diagram of an expanded quantum network in a concatenated entanglement-assisted, memory-assisted quantum interference measuring configuration in accordance with the present disclosure.

Referring to FIGS. 2 and 4A, network 20 may be expanded to incorporate one or more entanglement sources such as, for example, illustrated with respect to expanded network 40 illustrated in FIG. 4A (which includes a pair of entanglement sources and one quantum repeater 50). Networks 20, 40 may further be expanded beyond the expansion illustrated from network 20 to network 40 to provide additional entanglement photon sources node 140, associated quantum memory devices 130, and additional intermediate nodes 120, thereby increasing the distance of the network. More specifically, in order to expand the network to include a plurality of quantum repeaters, one (or both) of the end nodes 110 is displaced in favor of one more extension portions consisting of another entanglement photon source node 140, a first additional quantum memory device 130, another intermediate node 120, and a second additional quantum memory device 130. By extending the network 20, 40 with an appropriate number of extension portions, any suitable length network including any requisite number of quantum repeaters can be achieved.

Continuing with reference to FIG. 4A network 40 includes first and second end nodes 110, first and second intermediate nodes 120 connected to the respective first and second end nodes 110 via transmission channels 150 each including a quantum memory device 150. Network 40 further includes at least one quantum repeater 50 disposed between and interconnecting the first and second intermediate nodes 120.

Each quantum repeater 50 includes four transmission channels 150 (or portions thereof), two to four quantum memory devices 130, two entanglement photon sources node 140, and an intermediate node 120. The outer transmission channels 150 are configured to couple to additional intermediate nodes such as, for example, the first and second intermediate nodes 120 of network 40. In this manner, plural quantum repeaters 50 may be connected in a network with each adjacent pair of quantum repeaters 50 including an intermediate node 120 therebetween. Of course, the first and last quantum repeaters 50 are coupled to end receiving nodes 110, e.g., via additional intermediate nodes 120 or directly thereto.

Quantum repeaters 50 operate to generate first and second entangled pairs of photons (each pair including a photon "P1" and a photon "P2"), one pair generated from each entanglement photon source node 140. The "P1" photon of each pair is propagated to the intermediate node 120 of the quantum repeater 50 (which receives one photon from each entanglement photon source node 140) while the "P2" photons of each pair are propagated to respective nodes 120 on either side of the repeater 50, e.g., the first and second intermediate nodes 120 of network 40. At each node 120 where entanglement swapping occurs (or in measurement-device-independent QKD configurations), similarly as detailed above, a Bell-state measurement is performed after which the two remote photons (e.g., photons of any arbitrary distance apart) are entangled, thereby entangling all four photons using the principle of entanglement swapping. For example, with respect to intermediate node 120 of the quantum repeater 50, which receives the "P1" photon of each of the first and second entangled pairs of photons, the Bell-state measurement entangles the "P1" photons and, since the "P1" photons were previously entangled with the "P2" photons, the result is that all four photons are entangled. Although the bell-statement measurement destroys "P1" photons, teleportation of quantum information from one of the "P2" photons to the other is achieved, similarly as detailed above with respect to FIG. 3.

It is also possible to leverage quantum teleportation to transmit entanglement across numerous repeater nodes without performing the Bell-state Measurement, if all intermediary repeater nodes have sufficient visibility, as measured through HOM interference, across the total distance between the initial source and final destination node.

Where multiple quantum repeaters 50 are provided in a network, the above is similarly accomplished throughout the entire network via entanglement swapping across pairs of nodes, which destroys the intermediate photons in BSM processes. Entanglement can be repeated, pair-wise, with sequential expansion across all nodes in the total transmission path. Thus, the end nodes 110, regardless of the distance or number of quantum repeaters 50 therebetween, can establish a quantum correlation therebetween. This can be exploited to send qubits sequences between the end nodes 110. Similarly as detailed above, since an eavesdropper may not reconstruct the qubit sequence of the end nodes 110 from the Bell-state measurement results, the intermediate node 120 can communicate the coincidence detections classically (e.g., over a classical communication channel) to the end nodes 110.

In the above implementation, quantum information storage, quantum teleportation (entanglement swapping), and quantum networking are all critical elements. The most immediate application of quantum teleportation is to perform quantum communication over long distances. In this scenario, quantum memory devices 130, are fundamental to the successful communication of quantum information. The quantum memory devices 130 provide the ability to store and buffer quantum information until it is needed later and can also make the links more secure (e.g., immunity to side-channel detector attacks). The need for quantum repeaters 50 including quantum memory devices 130 in long-distance quantum communication links is due to photon losses in the optical fiber in which they are transmitted, limiting any transmission channel in distance, e.g., to distances <150 km, particularly with existing standard telecommunication infrastructure. The quantum repeaters 50, including quantum memory devices 130, overcome this distance limitation by combining quantum teleportation and quantum feature storage, as demonstrated above. In this way, a given distance above the distance limit is divided into shorter links (each below the distance limit) and entanglement is created and stored independently for each link, then distributed over distance.

It is noted, more specifically, that, in order for the above to work with probabilistic entanglement photon sources node 140, it is necessary to capture and store the pairs of entangled photons in quantum memory devices 130, which preserve their entangled state, until all photons are ready to be retrieved and read out at an intermediate node 120. Hence, a quantum memory device 130 is disposed in each transmission channel 150.

Figure 4B:
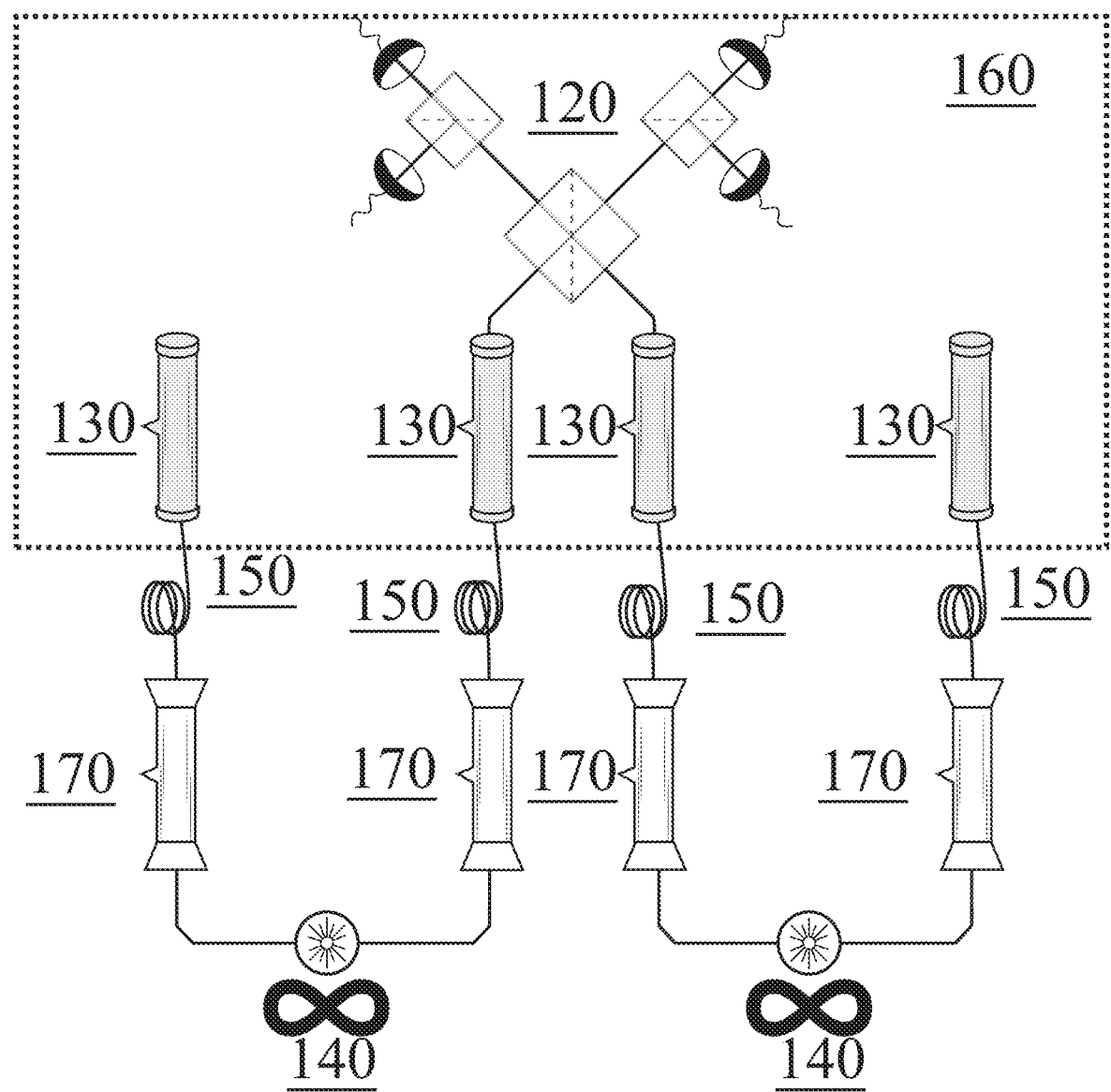
FIG. 4B is a simplified schematic diagram of a portion of the expanded quantum network of FIG. 4A using Quantum Frequency Conversion (QFC)

FIGS. 2, 4A, and 4B illustrate networks 20, 40 (or portions thereof) in various different configurations. FIG. 2, more specifically, illustrates a configuration where the network is configured for operation at the wavelength at which the quantum memory devices 130 thereof operate. With respect to the quantum memory devices detailed below, this wavelength may be 795 nm (for Rubidium 87-based memory devices), although other wavelengths are also contemplated, depending upon the particular quantum memory, or quantum source devices utilized.

With respect to the configuration detailed in FIG. 2, no Quantum Frequency Conversion (QFC) is necessary, as the network 40 (or portion thereof) operates at the same wavelength, e.g., 795 nm. In such a configuration, quantum memory devices 130 may be disposed in close proximity to and, in some embodiments, within the same enclosure 160, as the intermediate nodes 120 they surround. Thus, the distance from the quantum memory devices 130 to the corresponding intermediate nodes 120 is minimized, thus facilitating temporally synchronized receipt of the photons stored in quantum memory devices 130 at the intermediate nodes 120, which is an important factor in obtaining successful Bell-state measurement results at the intermediate nodes 120.

FIG. 4B illustrates a configuration where the network 40 (or portion thereof) is configured for operation at a wavelength different from a wavelength at which the quantum memory devices 130 operate and, in embodiments, different from the wavelength at which the entanglement photon sources node 140 operate. Such a configuration necessitates QFC, e.g., using quantum frequency converters 170 at the inputs to quantum memory devices 130 and at the outputs of entanglement photon sources node 140. However, such a configuration is beneficial with respect to transmission channels 150 including fiber optic cables in that it allows use of pre-existing fiber optic cabling networks and network infrastructure such as those utilized for wide area commercial telecommunications, where losses at wavelengths between 1300 nm and 1500 nm are negligible compared to losses at 795 nm. In embodiments, the entanglement photon sources node 140 are configured to operate at the same wavelength of the photons that are quantum frequency converted to telecom wavelengths, thus, the quantum frequency converters 170 at the outputs of the entanglement photon sources node 140 may be omitted.

In embodiments, the operating wavelength of the quantum memory devices 130 may be 795 nm. The operating wavelength of the transmission channels 150 may be a telecommunications infrastructure compatible wavelength such as, for example, 13xx nm (e.g., 1324 nm or 1367 nm), 15xx nm (e.g., 1550 nm), or a combination thereof. Intermediate nodes 120 may operate at any suitable wavelength, as may entanglement photon sources node 140. In the configuration of FIG. 4B, as with the configuration of FIG. 2, quantum memory devices 130 are disposed in close proximity to and, in some embodiments, within the same enclosure 160, as the intermediate nodes 120 to facilitate temporally synchronized receipt of the photons stored in quantum memory devices 130 at the intermediate nodes 120.

FIG. 4A illustrates another configuration where the network 40 (or portion thereof) is configured for operation at a wavelength different from a wavelength at which the quantum memory devices 130 and the entanglement photon sources node 140 operate. Such a configuration necessitates QFC; however, rather than using separate quantum frequency converters as with the configuration of FIG. 4B, the quantum memory devices 130 themselves function to perform the necessary QFC (after retrieval), thus providing the benefit of enabling use of pre-existing fiber optic networks, such as those utilized for telecommunications as at least part of transmission channels 150. In embodiments where quantum memory devices 130 and the entanglement photon sources node 140 operate at different wavelengths, quantum frequency converters (not shown) may be disposed therebetween.

The configuration of FIG. 4A further differs from that of FIG. 4B in that, with respect to FIG. 4A, quantum memory devices 130 are disposed in close proximity to and, in some embodiments, within the same enclosure 180, as the entanglement photon sources node 140 to function as the aforementioned quantum frequency converters prior to transmission of the photons across the transmission channels 150, e.g., the telecommunication fiber optic network. The operating wavelength of the quantum memory devices 130 may be 795 nm and/or the operating wavelength of the transmission channels 150 may be a telecommunications wavelength such as, for example, 13xx nm (e.g., 1324 nm or 1367 nm), or 15xx nm (e.g., 1550 nm). Intermediate nodes 120 may operate at any suitable wavelength, as may entanglement photon sources node 140.

Figures 1, 2, 4C:
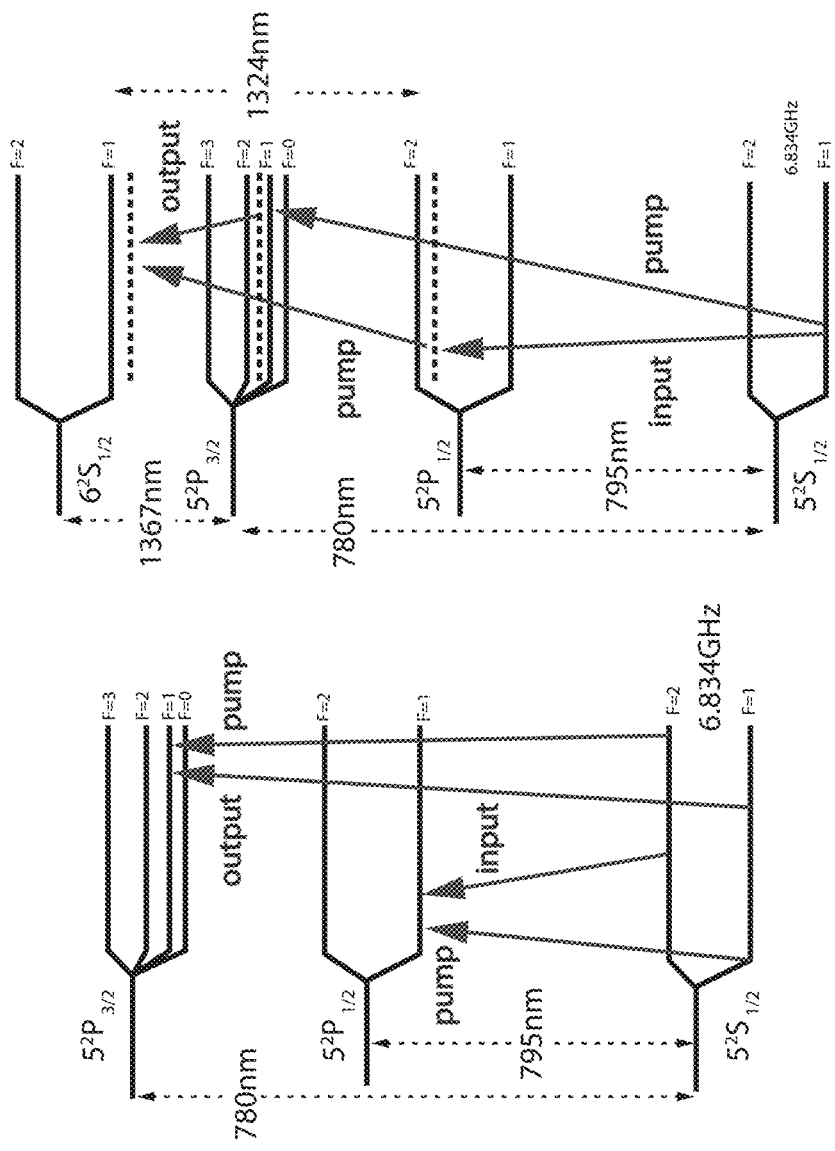

FIGS. 4C-1 and 4C-2 illustrate QFC, at the single photon level, using quantum memory devices 130 (FIG. 1). FIG. 4C-1 illustrates QFC between 795 nm and 780 nm, while FIG. 4C-2 further illustrates QFC to 1324 nm and up to 1367 nm. These conversions are illustrative only and non-limiting; quantum memory devices 130 may similarly be utilized to convert the wavelength from the 795 nm wavelength utilized to store the photons in the quantum memory devices 130 to any suitable wavelength such as a different telecommunication wavelength, e.g., 13xx nm (e.g., 1324 nm or 1367 nm), or 15xx nm (e.g., 1550 nm). The QFC is accomplished via quantum frequency manipulation of probe fields under Electromagnetically Induced Transparency (EIT), which is utilized by quantum memory devices 130 (see below with reference to FIGS. 11-14). More specifically, the QFC may be accomplished between the rubidium (Rb) D1 and D2 lines through the use of adiabatic transfer using double-lambda schemes.

Turning to FIG. 5, an intermediate node 120 is illustrated and described in greater detail. Intermediate node 120 includes a demultiplexer 222 coupled to the transmission channel 150 and configured to separate the received signal into one or more classical signal lines 223 and one or more quantum signal lines 224. Photons of two different but relatively similar wavelengths are transmitted along the quantum signal line 224, the first containing the quantum information encoded in the quantum features, e.g., polarizations, thereof and the second serving as a control wherein the photons thereof have a known initial quantum feature, e.g., polarization. For example, the first, quantum information photons, may be transmitted at, or converted to, a wavelength of 795 nm, the wavelength at which quantum memory devices 130 (FIG. 1) operate, while the second wavelength, corresponding to the control photons, may be 785 nm. Providing different wavelengths enables easier separation of the different wavelengths from one another while providing relatively similar wavelengths enables estimating the properties of one by measuring the properties of the other. Thus, a balance is struck between sufficiently different and sufficiently similar wavelengths. In embodiments, the second wavelength may be within about 5% of the first wavelength; in other embodiments, within about 3% of the first wavelength; and, in still other embodiments, within about 1% of the first wavelength.

The photons transmitted along quantum signal line 224 are directed through a dichromatic mirror 226 to thereby separate the photons of 785 nm from those of 795 nm. The photons of 785 nm impinge upon a polarimeter or polarization detector 230 to determine a resultant polarization thereof. This classical (non-quantum) signal needs not large amounts of power but sufficient enough to be transmitted throughout the distance between the node pairs. Since the initial polarization of the photons of 785 nm is known, a polarization drift during transmission of the control photons can be determined based upon a comparison of the initial polarization and the resultant polarization. Since the control photons are of a sufficiently similar wavelength as the quantum information photons (qubits), a polarization drift of the quantum information photons, despite not knowing the initial polarization thereof, can be determined and accounted for by applying a correction. Although the above is detailed with respect to polarization, it is contemplated that drift in other quantum features may be detected and compensated for in a similar manner.

Continuing with reference to FIG. 5, the quantum information photons, e.g., of 795 nm, continue through a notch narrow filter 231 (of 795 nm) to eliminate any photons that are not at that wavelength, e.g., to eliminate residual photons of 785 nm that were not diverted by the dichromatic mirror 226. After passing through the notch narrow filter 231, the quantum information photon(s) (qubit(s)) may continue to a quantum memory device 130 for storage and selective retrieval, e.g., to enable synchronized retrieval and transmission to Bell-state measurement station 240 as photon(s) from another quantum memory device 130 feeding Bell-state measurement station 240.

Upon retrieval, the photon(s) travel to the Bell-state measurement station 240 which includes, as noted above, a Non-Polarizing Beam Splitter (NPBS) 242 at which the qubits interfere, and two single-photon detectors (SPCMs) 244 placed at the output arms of the NPBS 242 to generate a signal every time they record a hit, e.g., detect a photon, indicating the polarization thereof. The signal is output to a suitable processor such as a microcontroller or FPGA 246. In addition to determining and outputting the polarization of the qubits, e.g., Horizontal (H), Vertical (V), Diagonal (D), or Anti-diagonal (A), the Bell-state measurement station 240 also enables checking of the HOM dip to determine visibility at intermediate node 120, as detailed below. An etalon (not shown) may also be provided before the NPBS 242 to remove any residual from the co-propagating polarization beam.

The FPGA 246 of intermediate node 120, as noted above, receives the signals indicating the polarizations of the qubits. In addition, the FPGA 246 receives the information transmitted over the classical signal lines 223 and outputs information for transmission over the classical signal lines 223, e.g., indicating the result of the HOM dip check (as detailed below) and/or the detected polarizations of the qubits. A clock signal 249, e.g., derived from a GPS, a network time protocol server, or otherwise synchronized time-base, may be provided to FPGA 246 to enable further precision on the synchronization with the clock signal and triggers transmitted over the classical signal lines 223. Prior to outputting the detected polarizations of the qubits, the FPGA 246 may perform correction on the detected polarizations, e.g., based upon the polarization drift detected on the control photons. This correction may be proportional to the detected polarization drift, determined by inputting the detected polarization drift into a suitable algorithm, or otherwise based upon the detected polarization drift. If feasible, this correction could be implemented in hardware as well as or as an alternative to software regulated.

Figure 6:
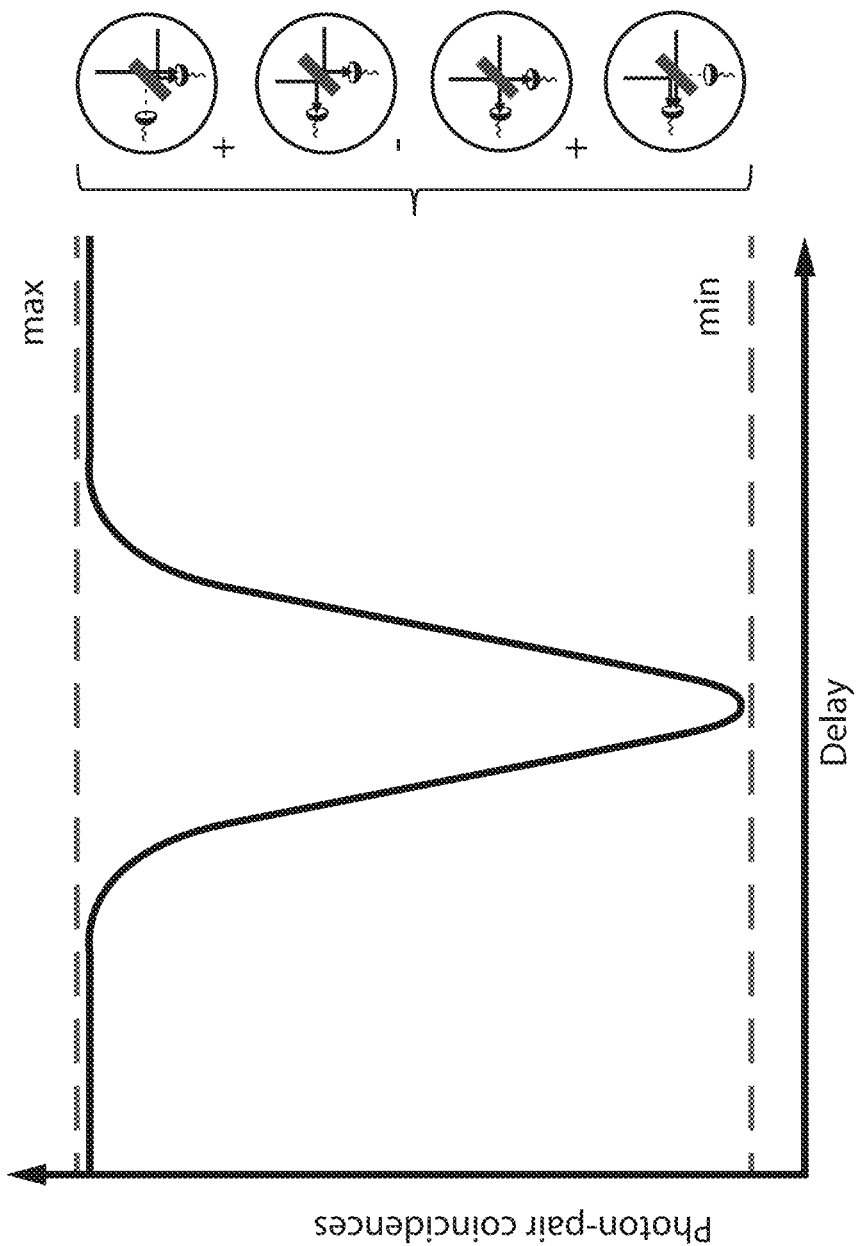
FIG. 6 is an exemplary Hong-Ou-Mandel (HOM) interference curve of coincidence rate versus time delay or polarization in accordance with the present disclosure.

Referring also to FIG. 6, data from the coincidence counts of the photon detectors is analyzed to calculate the Hong-Ou-Mandel (HOM) interference coincidence rate between the output arms of the NPBS 242. FIG. 6 illustrates an exemplary HOM interference curve exhibiting the signature coincidence dip caused by HOM interference. This coincidence dip is indicative of visibility which can be between 0-50%. A visibility of 50% indicates that the input qubits received at intermediate node 120 are perfectly temporally synchronized and include the same optical frequency and polarization, they are virtually indistinguishable. Although the maximum visibility of 50% is not required for a network to be operative, there is a minimum visibility threshold below which the network would not be useful for quantum secured communication. As such, checking the HOM dip to determine visibility, e.g., periodically at any suitable fixed, varied, and/or variable intervals, based on event occurrence or other conditions, etc., provides an indication if the network is operational for quantum information transfer and/or quantum secured communication; it can also simultaneously be a good metric of the network's health status and it's losses, similar to a block error rate in a conventional network.

Continuing with reference to FIGS. 5 and 6, checking the visibility at intermediate node 120, more specifically, may be performed in a coarse check mode, wherein intermediate node 120 receives, for example, a continuous or pulsed many-photon (classical) signal to determine a first order interference pattern thereof. Such a classical wave interference can have a visibility of up to 100%; acceptable limits may include visibilities of 95% and above, although other visibilities may also be acceptable. The coarse check mode is aptly named given that achieving a minimum visibility with respect to a many-photon continuous or pulsed classical signal is generally less sensitive to variations, e.g., temporal variations, optical frequency variations, etc., as compared to achieving a minimum visibility at the single-photon level, e.g., in the fine HOM check mode detailed below. Further, such a check is relatively easier and faster to perform compared to the fine HOM check detailed below. Thus, by performing the coarse check, it can be determined, for example, whether there is a system failure or multiple failures that would render network 10 inoperable for quantum information transfer.

With respect to the fine HOM check mode, an HOM dip is evaluated to determine visibility at intermediate node 120. More specifically, the fine HOM check mode may be performed via intermediate node 120 receiving and checking the HOM dip to determine visibility at the single-photon level, e.g., from pulses each containing a single photon. By performing the fine check, it can be determined, for example, whether there are system setting/calibration issues that would render the network inoperable for, or reduce performance of, quantum information transfer. Performing either or both of the above checks during network downtime, or in between transmissions, may be utilized to guarantee optimal network performance.

In embodiments where the coarse check is performed first, the fine check need not be performed if the minimum visibility at the coarse check is not met. If the minimum visibility at the coarse check is met (e.g., visibility is above a set threshold), the fine check may then be performed. Alternatively or additionally, the fine and/or coarse checks may be performed at similar or different intervals, in response to similar or different events or conditions, etc. It should be noted that the fine check is optimized when the input photons per pulse is equal to 1 or fewer photons.

With regard to the coarse check mode, as noted above, the minimum visibility may be about 95%. With respect to the fine check mode, the minimum visibility, in embodiments, may be about 40%, in other embodiments, about 42%, in yet other embodiments, about 44%, in still other embodiments, about 46%, and, in still yet other embodiments, about 48%.

Figure 7:
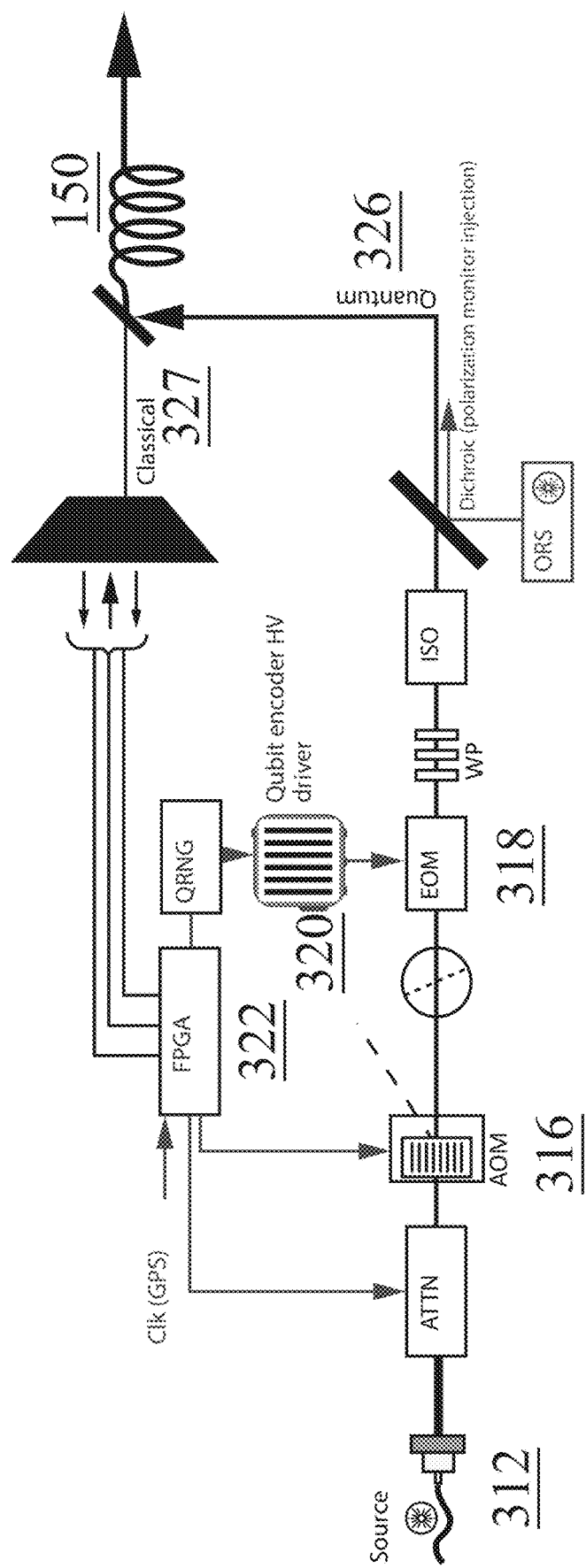
FIG. 7 is an enlarged, more detailed schematic diagram of an end node of a quantum network in accordance with the present disclosure.

Turning to FIG. 7, a transmission node of an MA-MDI-QKD scheme is described. The transmission node is configured as an independent quantum random polarization qubit (or other suitable quantum feature) generator. The transmission node includes a laser source 312 configured to produce an output laser beam. A pulse picker (or other suitable filtering device) and an Acoustic Optical Modulator (AOM) 316 control the temporal shape and timing of the photons. More specifically, the AOM 316 creates pulses with a defined number of photons, e.g., 1 photon (in embodiments). AOM 316 may be controlled by an FPGA 322.

The Electro-Optical Modulator (EOM) 318 is configured to receive the pulses and randomly change a quantum feature, e.g., polarization, of the photons. A high-voltage EOM driver 320 is used to control the output of defined quantum features (e.g. specific polarizations) encoding quantum information originating from the EOM 318. More specifically, at each trigger, FPGA 322 reads a value from a quantum random number generator source sequence for the polarization to encode, e.g. a sequence of BB84-states, and outputs a logic signal in one of the multiple channels of the high-voltage EOM driver 320 that control the power rail to provide to the EOM 318. The high-voltage EOM driver 320 produces specific output high voltages depending on which of the input logic channels (e.g. four channels, corresponding to the four polarizations) is output to the EOM 318. The resultant quantum signal 326 may be co-propagated along with classical signals 327 along a transmission channel 150. The classical signals may be multiplexed/demultiplexed to transmit information to/from the FPGA 322.

Figure 8:
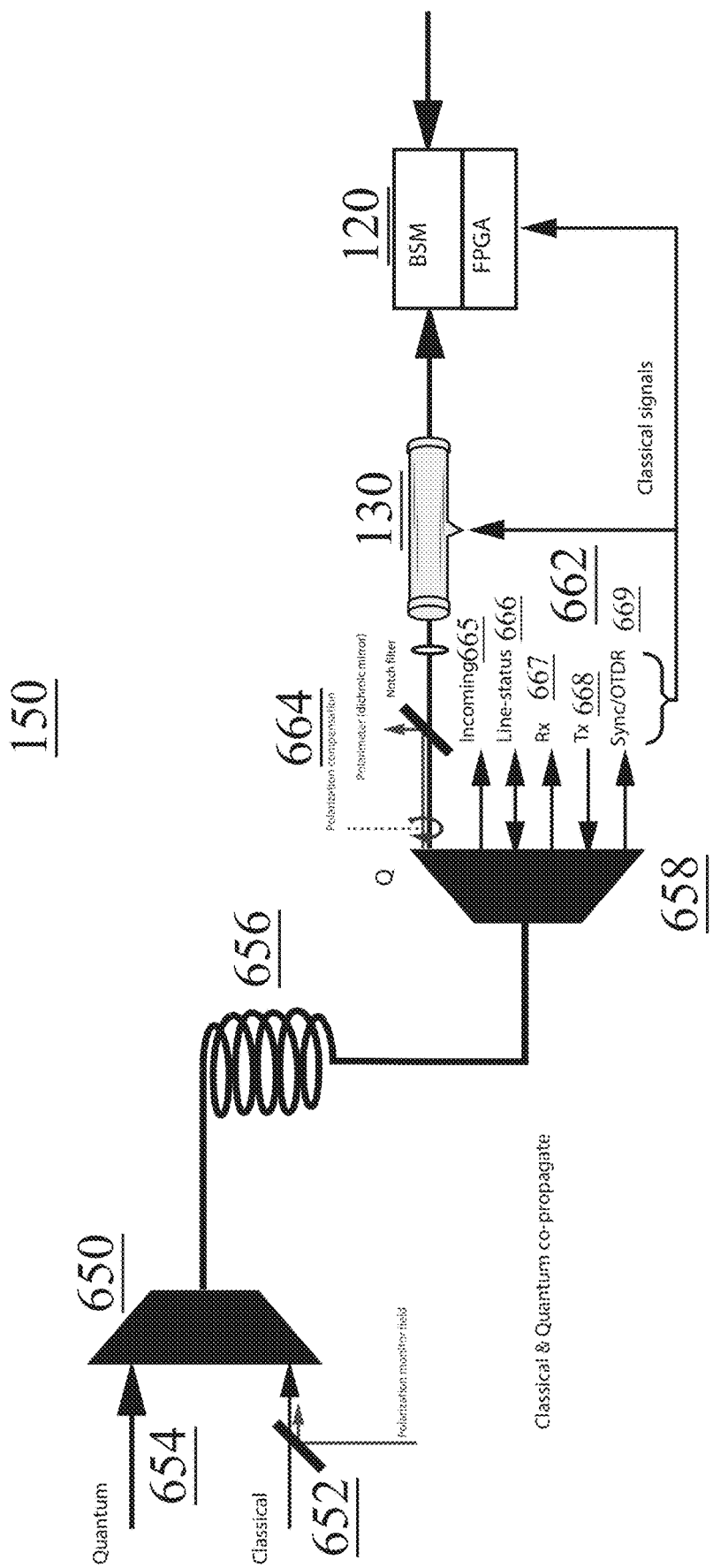
FIG. 8 is an enlarged, more detailed schematic diagram of a transmission channel between an end node and an intermediate node in accordance with the present disclosure.

Turning to FIG. 8, a transmission channel 150 from, for example, an end node 110 (FIG. 1), or an adjacent source node, to an intermediate (BSM) node 120, is illustrated, although transmission channel 150 may be disposed between an intermediate node 120 and an entanglement photon source node 140 (FIG. 2), or between any other suitable nodes.

Transmission channel 150 includes a multiplexer 650 configured to receive one or more input classical signal lines 652 and one or more input quantum signal lines 654 and to combine the input signal lines 652, 654 for co-propagation along fiber optical cable 656, although separate propagation and/or propagation through free space or other media is also contemplated. The co-propagated signal is received at a demultiplexer 658 that serves to separate the received signal into one or more output classical signal lines 662 and one or more output quantum signal lines 664. The photons transmitted along the output quantum signal line 662 are polarization monitored to correct for polarization drift along the channel and then transmitted to a quantum memory device 130 for storage and, upon retrieval from quantum memory device 130, are transmitted to an intermediate BSM node 120. Receipt of the photons at intermediate node 120 and processing thereof is detailed above with respect to FIG. 5.

The one or more input and output classical signal lines 652, 662 may include, for example, an incoming qubit notification line 665, a line-status line 666, a receiving RX line 667, a transmitting TX line 668, and a time-sync line 669, although additional or alternative lines are also contemplated. These lines 665-469 enable communication of information classically, e.g., digitally, between nodes. More specifically, incoming notification line 665 provides an indication that a quantum communication is forthcoming, allowing the quantum memory device 130 and/or the intermediate node 120 to ignore other noise on the transmission line unless and until an incoming notification is received. The line status line 666 may provide information regarding the transmission channel 150 such as, for example, a length of the transmission channel 150, for use in calculating the appropriate storage times required from the quantum memory pairs at the BSM-node 120 in order to ensure synchronized arrival of the photons at the intermediate BSM node 120. The receiving and transmitting lines 667, 668, respectively, enable classical communication of information such as, for example, the results obtained from the Bell-state measurement at the intermediate node 120, the results of the coarse interference check and/or the fine HOM check at the intermediate node 120, other feedback and/or control information, etc. The time-sync line 669 provides a clock signal to synchronize the various components of the network and may be used in conjunction with local GPS clock signals received by one or more of the distributed network components.

As illustrated in FIG. 8, quantum memory device 130 is disposed between the demultiplexer 658 and the intermediate node 120. Alternatively, quantum memory device 130 may be disposed upstream of the multiplexer 650, e.g., between the multiplexer 650 and an end node 110 (FIG. 1) or an entanglement photon source node 140 (FIG. 2). In such configurations, the classical signals would bypass the quantum memory device, e.g., using dichromatic mirrors on the input and output beam to separate out the classical signals for bypassing the quantum memory device. The configuration illustrated in FIG. 8 may be utilized, for example, with respect to the configurations of FIGS. 2 and 4B, while the other configuration noted above may be utilized, for example, with respect to the configuration of FIG. 4A.

Figure 9:
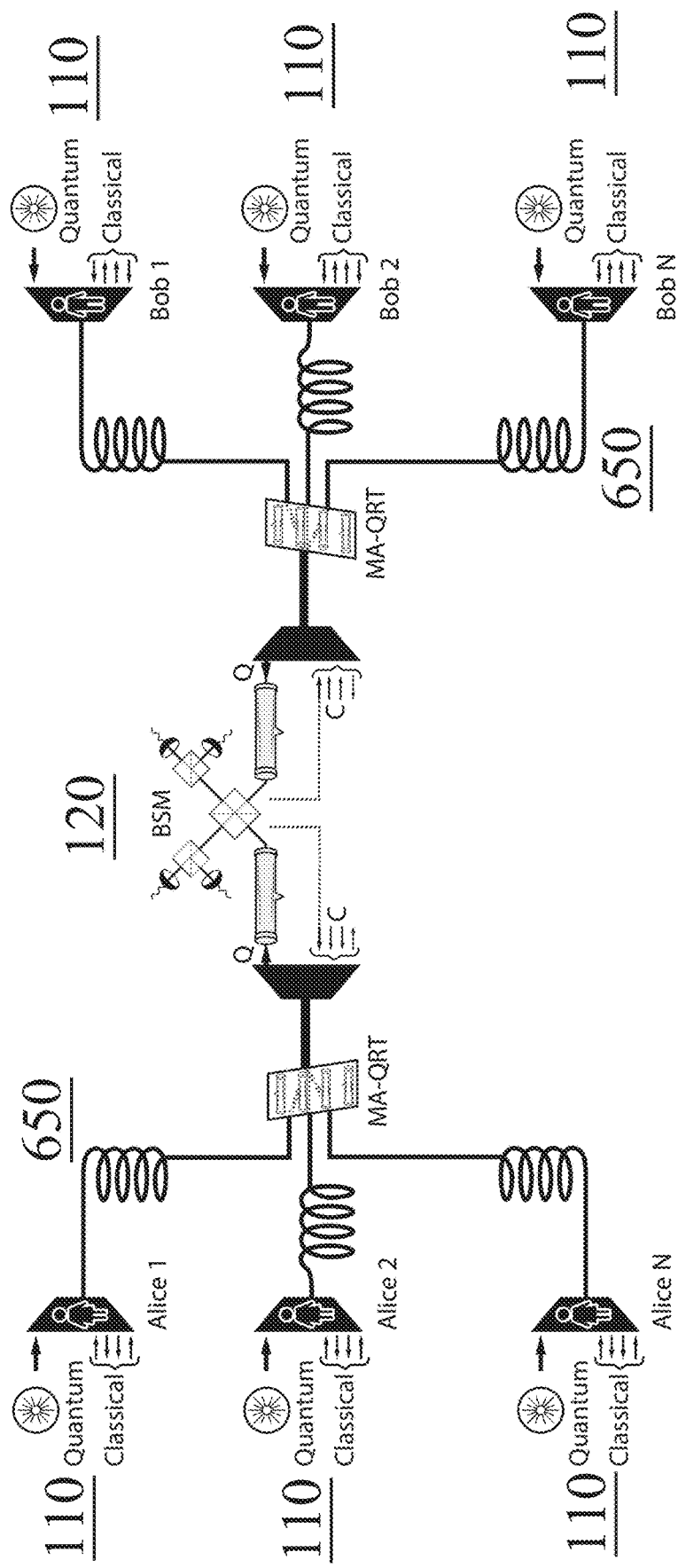
FIG. 9 is a schematic diagram of a quantum network in accordance with the present disclosure including a plurality of first end nodes and a plurality of second end nodes.

Referring to FIG. 9, the transmission channels of the present disclosure are not limited to single node-to-node channels (or point-to-point communications). For example, in some embodiments, as illustrated in FIG. 9, a transmission channel 650 may interconnect a plurality of first end nodes 110 with an intermediate node 120, while a plurality of second end nodes 120 are connected to the intermediate node 120 via another transmission channel 650. A multiplexer may be disposed at each end node 110 to combine the classical and quantum signals thereof and co-propagate (or otherwise propagate) the same along the transmission channel 650. In other embodiments, a transmission channel 650 may interconnect a plurality of first end nodes 110 with an intermediate node 120, while a single second end node 120 may be connected to the intermediate node 120 via a transmission channel, e.g., similar to transmission channel 150 (FIG. 8). Additional routing and/or combining of signals may be accomplished along transmission channel 650 to further co-propagate (or otherwise propagate) the signals from different end nodes 110. Regardless of the particular configuration, the quantum signals must propagate end-to-end through an effectively optically transparent network, whereas the classical signals can be routed, amplified, or switched depending on the network requirements.

Continuing with reference to FIG. 9, multi-node quantum networks (e.g., networks that don't utilize point-to-point communications) require traffic routing. More specifically, with respect to such networks, for example, there is a need to determine a route of a quantum path taking into account the characteristics of the various nodes (e.g., HOM check results (thus enabling avoidance of a sub-optimal or non-functioning node(s))) and links between the nodes, as well as the resources that are in use (e.g., whether nodes are consumed by other quantum paths). That is, instead of simply always using the shortest quantum path (based on hop-count or cumulative distance-length metrics, for example), determining the route of a quantum path may consider other factors such as those detailed above. It is noted that, in some instances, the determined route may in fact be the shortest quantum path.

As an example of the above, when a node in a routed network determines the route for a quantum path, e.g., from A to F, there may be a need to know the characteristics of the nodes (B, C, D, E) and the links (A-B, B-C, B-D, etc.) as input to the path determination function. This will determine where the signal is routed to and through which nodes. The co-propagating classical signals take care of this and are re-routed depending on said determination. The quantum signals are preferably routed alongside, but may be propagated through a different route. Regardless of path, all routes are considered effectively optically transparent for the quantum path.

Traffic routing such as detailed above enables determination of a quantum path taking into account what routes (or portions thereof) are in high demand (e.g., with relatively small bandwidth available) and what routes have more available bandwidth. Further, depending on the wavelength of the qubit (or on the distance it needs to travel), the route can be determined to go through (or avoid) a path that includes QFC. Likewise, the route can be determined to go through or avoid one or more quantum memory devices, depending upon whether buffering is needed.

The above-detailed traffic routing for a quantum network utilizes information about the characteristics of the nodes and the links, and information about the resources already consumed by other quantum paths before the route of a new quantum path is determined, and may be accomplished using classical signals that communicate health and/or status information of the network and nodes (e.g., HOM check results at each applicable node). In embodiments, determining the quantum path may include choosing the quantum path with the least losses by selecting the shortest path (as a default) unless it is determined (e.g., using the health and/or status information provided by the classical signals) that the shortest path is degraded or not operating efficiently. Other configurations and/or routing rules for determining a quantum path are also contemplated.

In addition to the above-described quantum path determination, any routing structures, e.g., quantum routers, or separate routing structures may need to be provided to similarly (or differently) route the classical signals along with the quantum signals and to correlate the classical control information with the appropriate qubits. Thus, at least two data planes, at least one for quantum communication and at least one for classical communication, may be required, and any routing structures utilized must be able to accommodate the same. Further, metadata associated with the quantum communications (qubits) may be utilized to facilitate correlating the classical control information and routing. In routing embodiments as well as point-to-point embodiments, the metadata associated with a qubit or entangled pair of qubits can be included with the co-propagated with the classical data and may include the time at which the entangled pair was created, to where the entangled pair should be distributed, and/or other useful information to facilitate transmission and/or routing.

Figure 10A:
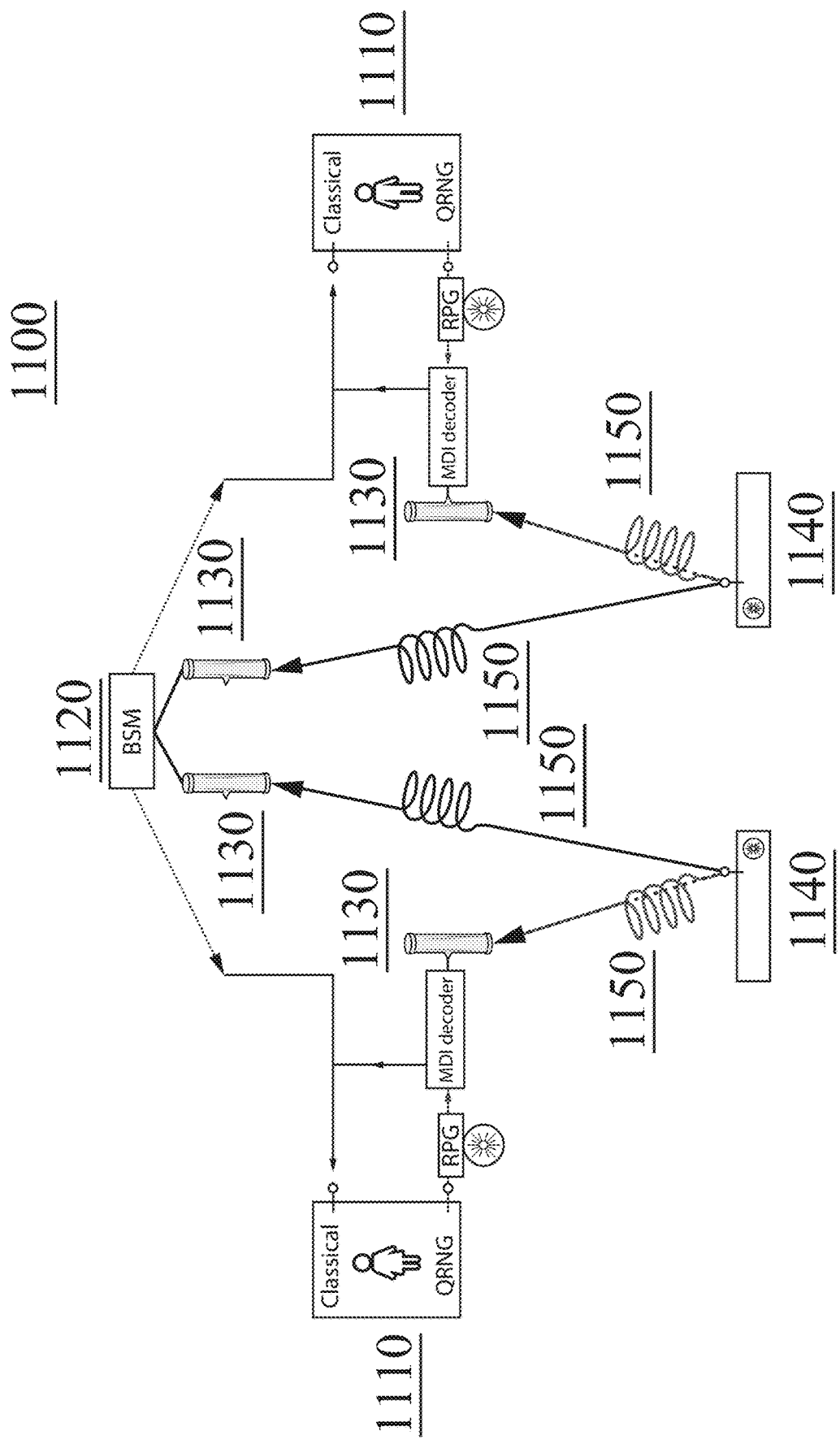
FIG. 10A is a schematic diagram of a quantum network in an entanglement-assisted, memory-assisted quantum interference measuring configuration over asymmetric fiber lengths in accordance with the present disclosure.
Figure 10B:
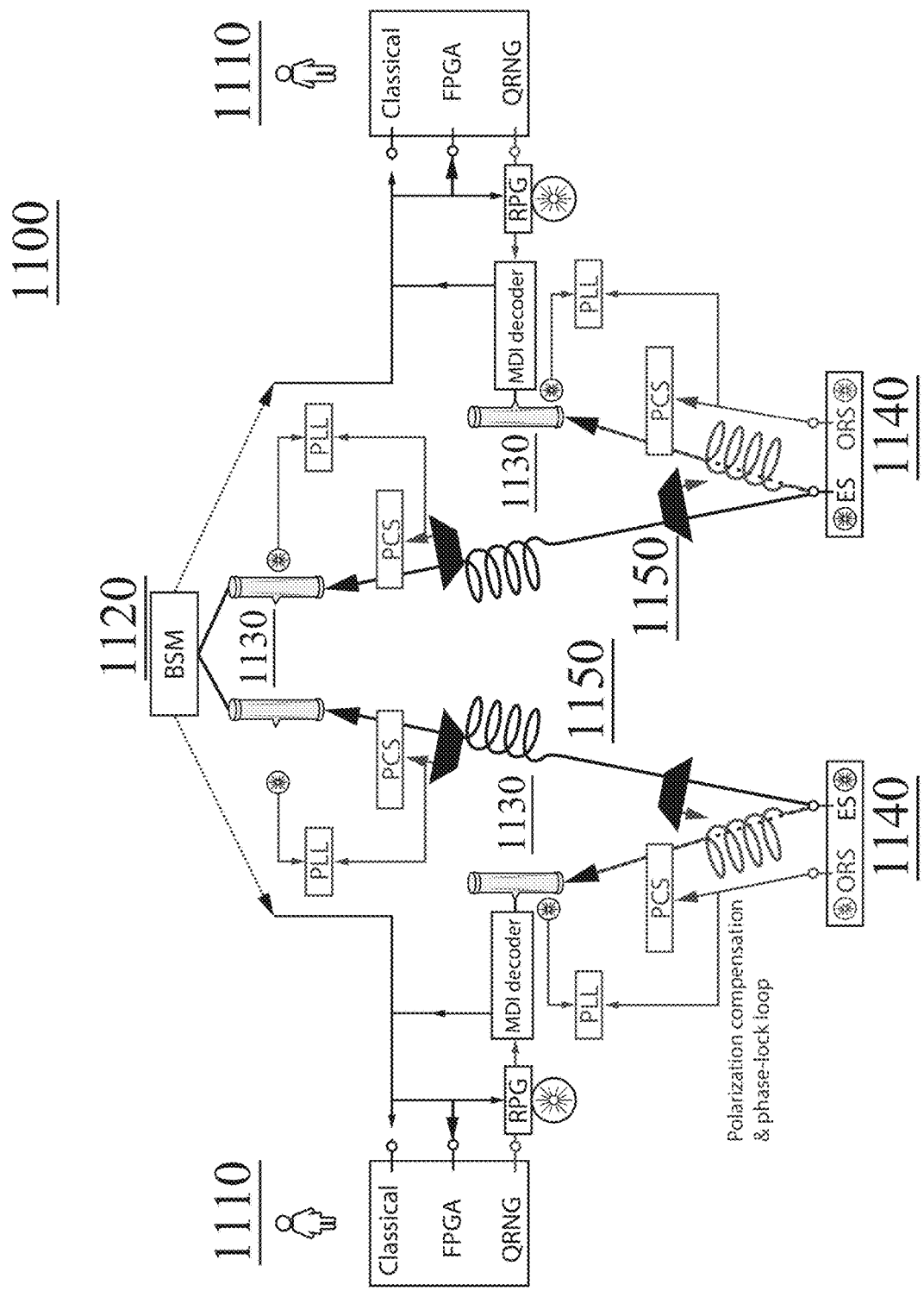
FIG. 10B is a schematic diagram of the quantum network of FIG. 10A further including a control scheme in accordance with the present disclosure.
Figure 10C:
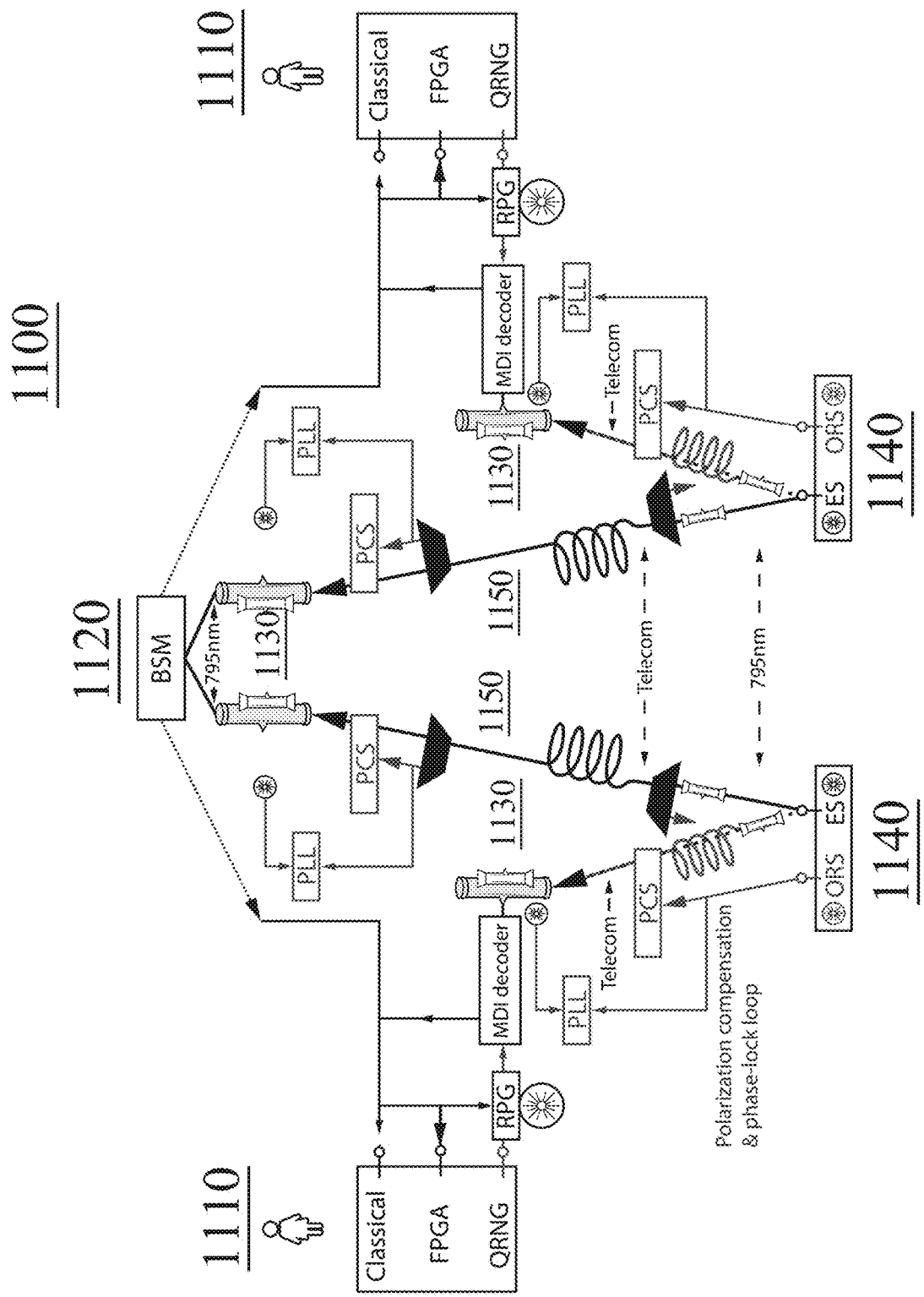
FIG. 10C is a schematic diagram of the quantum network of FIG. 10B further configured for operation at telecommunication frequencies in accordance with the present disclosure.

FIGS. 10A-10C schematically illustrate, within increasing levels of control, communication, and/or feedback, an exemplary quantum network 1100 in accordance with the present disclosure. To the extent consistent, any of the aspects and features detailed above with respect to the other networks and/or components thereof may be utilized in conjunction with network 1100, and vice versa. Network 1100 includes first and second end nodes 1110, an intermediate node 1120, and first and second entanglement photon source nodes 1140. Although illustrated in this configuration, other suitable configurations and/or expanded networks are also contemplated.

Referring to FIG. 10A, similarly as detailed above, first and second entanglement photon source nodes 1140 are configured to generate first and second entangled pairs of photons that are transmitted along transmission channels 1150. More specifically, one photon of each pair is transmitted along a transmission channel 1150 including a quantum memory device 1130 to enable synchronized receipt of the photons at the intermediate node 1120. The intermediate node 1120 performs a Bell-state measurement at the intermediate node 1120, thereby entangling the photons of the first and second pairs via quantum teleportation (entanglement swapping). Further, the intermediate node 1120 is configured to communicate, over a classical communication channel, e.g., via a classical signal, with the end nodes 1110 such as, for example, to indicate the results obtained from the Bell-state measurement at the intermediate node 1120, the results of the coarse interference check and/or the fine HOM check at the intermediate node 1120, other feedback and/or control information, etc.

Referring to FIG. 10A, end nodes 1110 can use the shared entangled pair for any application, in this example to establish a quantum repeater enhanced MDI-QKD network by each performing a similar measurement to the Bell-state measurement node 1120 using one entangled photon and one randomly polarized photon. In order to verify the transmitted secret key, end nodes 1110 need to know the result of all the measurements, transmitted to each node via a classical/digital communication link.

FIG. 10B is a more detailed schematic of FIG. 10A, with added components to allow for active control and optimization of the connectivity between all nodes. More specifically, at the first and second entanglement sources 1140, a classical optical reference source is added to be transmitted along transmission channels 1150 and used to feedback control the network. At each of the quantum memory devices 1130, the reference light is used to compensate for polarization rotation induced by the transmission channels 1150. Additionally, a portion of the reference signal is used to create a remote Phase Lock Loop (PLL) between the control laser of each memory unit 1130 and the pump laser of each entanglement source unit 1140. Additionally, the optimization network is symmetric meaning that in order to create the PLL and/or the active feedback polarization compensation, the reference classical light could be placed at the memory units 1130 and/or the intermediate nodes 1120 and counter propagate in respect to the entangled photon through the transmission channels 1150. In a scenario like that, the PLL and polarization compensator would be placed at the entanglement source nodes 1140.

FIG. 10C expands the concept depicted in FIG. 10B for implementation using telecom infrastructure. Although not necessary, in order to minimize the loss in the fiber optics 1150, the qubits frequency can be converted to a telecom frequency at source nodes 1140 using quantum frequency converters and subsequently down converted to atomic wavelengths at the memories 1130 using similar quantum frequency converters. Additionally, the quantum memory units 1130 could be used either to work directly at telecom wavelength or be used as atomic frequency convertors in the network in order to maximize the quantum connectivity of the protocols.

Referring generally to FIGS. 11-14, an exemplary quantum memory device configured for use as any or all of the quantum memory devices 130 (see e.g., FIGS. 1, 2, and 4) of the above-detailed quantum networks is described.

The quantum memory device detailed below utilizes warm-vapor Electromagnetically Induced Transparency (EIT) as a means to store and retrieve the photons. Upon entering the quantum memory device, the photons enter a vapor cell containing atoms of Rubidium 87 and are absorbed by the atomic vapor cell naturally. By using a control beam, the photons can be stored and retrieved with variable storage times. Further, the quantum memory device detailed below is configured to operate at ambient temperature and, in embodiments, at room temperature. This enables any of the quantum network devices, systems, and methods of the present disclosure to likewise operate at ambient temperature and, in embodiments, at room temperature.

FIGS. 11-14, more specifically, illustrate an ambient-temperature quantum memory device suitable for use with the above-detailed quantum networks. For the purposes herein, "ambient temperature" refers to temperatures that are outside laboratory operation or laboratory-controlled environments, e.g., non-laboratory-controlled temperatures, temperatures not influenced by one or more of cryogenic cooling systems, laser cooling systems, vacuum systems, etc. "Ambient temperatures" may include room temperatures, environment temperatures (e.g., 0° C. to 400° C.), or the like. In embodiments, the quantum memory devices are configured for room temperature operation. These quantum memory devices enable the networks detailed herein to operate at ambient temperature or, in embodiments, at room temperature. Room temperature may include temperatures of an equipment room in which commercial telecommunications infrastructure operates.

Figure 11:
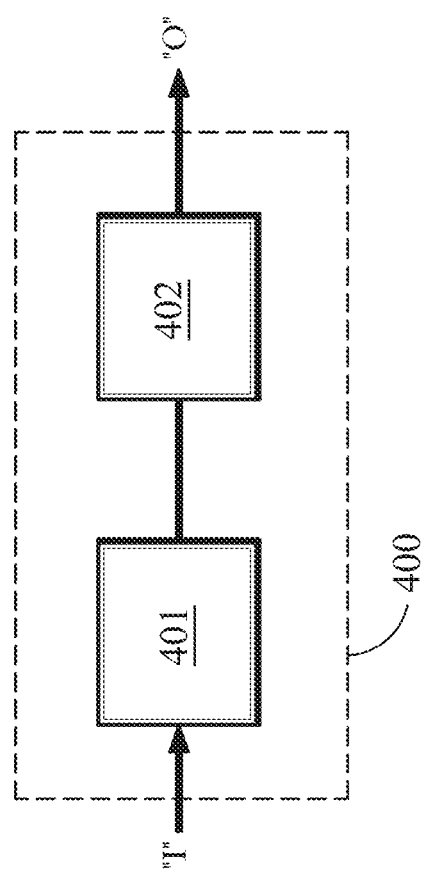
FIG. 11 is a block diagram of a quantum memory device configured for use in accordance with the present disclosure.

Referring initially to FIG. 11, a quantum memory device 400 is configured to: 1) receive, at an input "I," a quantum communication such as, for example, photons storing quantum information, e.g., polarization qubits; 2) store the photons within quantum memory module 401 thereof; 3) selectively retrieve the photons and perform filtering via filtering module 402; and 4) send the photons as a quantum communication from an output "O." Quantum memory device 400, more specifically, allows for independent channels performing Quantum Key Distribution (QKD) using the BB84 protocol (or other suitable protocols such as MDI-QKD and EPR-based protocols) and polarization qubits; works with arbitrary polarization qubits with retrieval fidelities (the quality of a retrieved quantum-state; defined as the probability that the state was correctly interpreted) greater than 90% and with fidelities greater than 98% upon using the auxiliary field filtering scheme detailed below; provides for the storage of randomized photons in a shot-by-shot (e.g., photon-by-photon) manner; and enables creation of a long-distance quantum secure networks, e.g., such as those detailed hereinabove, utilizing one or more of such quantum memory devices 400 at ambient/room-temperatures and outside the controlled laboratory setting. Exemplary embodiments of quantum memory device 400 are described in more detail in U.S. patent application Ser. No. 17/042,054, which is hereby incorporated by reference herein in its entirety.

Figure 12A:
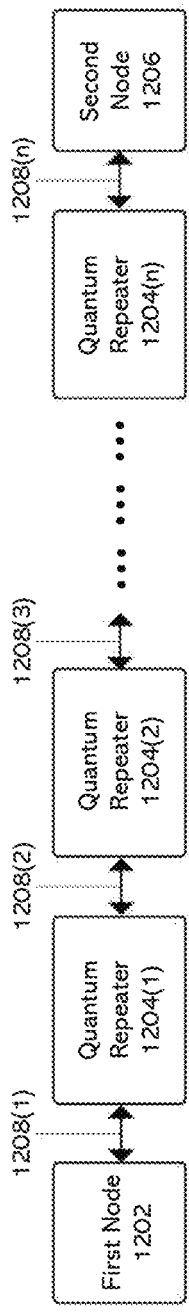
FIG. 12A is a block diagram of a quantum network in accordance with the present disclosure configured for long-distance entanglement distribution such as, for example, for use in Quantum Key Distribution (QKD)

Turning to FIG. 12A, as noted above, the present disclosure may be implemented for use in Quantum Key Distribution (QKD), e.g., as an EA-MA-MDI-QKD quantum network. FIG. 12A is an example block diagram of a network architecture for distributing quantum keys in an EA-MA-MDI-QKD configuration. As shown in FIG. 12A, a first node 1202 may distribute a quantum key to second node 1206 to undertake an authentication step that may involve a private cryptographic key transmitted from first node 1202 to second node 1206.

First node 1202 may transmit a cryptographic key to second node 1206 through quantum repeaters 1204(1) to 1204(n). In some examples, first node 1202 and second node 1206 may include physical processors such as a quantum processor, a classic processor (e.g., an integrated circuit processor), or a combination thereof. First node 1202 may function as an authentication server, a data server, a computing client, or a combination thereof. First node 1202 may generate a cryptographic key for use in encrypting and decrypting data. The secure transmission of a cryptographic key from first node 1202 to second node 1206 may enable the secure transmission of data between first node 1202 and second node 1206. First node 1202 may generate a quantum key and/or convert a cryptographic key encoded as a sequence of binary digits to a quantum key encoded as a sequence of qubits (e.g., a quantum key corresponding to the BB84 protocol). In some examples, first node 1202 may transmit the quantum key to second node 1206 over a series of transmission channels. The transmission channels may include free space and/or optical fiber cables. The physical distance between first node 1202 and second node 1206 may exceed a distance over which optical signals (e.g., qubits) may reliably travel due to attenuation and signal interference. In order to overcome this distance limitation a number of sequential quantum repeaters 1204(1) may be required to enable transmission of the optical signals from transmission channel segment 1208(1) to transmission channel segment 1208(2).

Figure 12B:
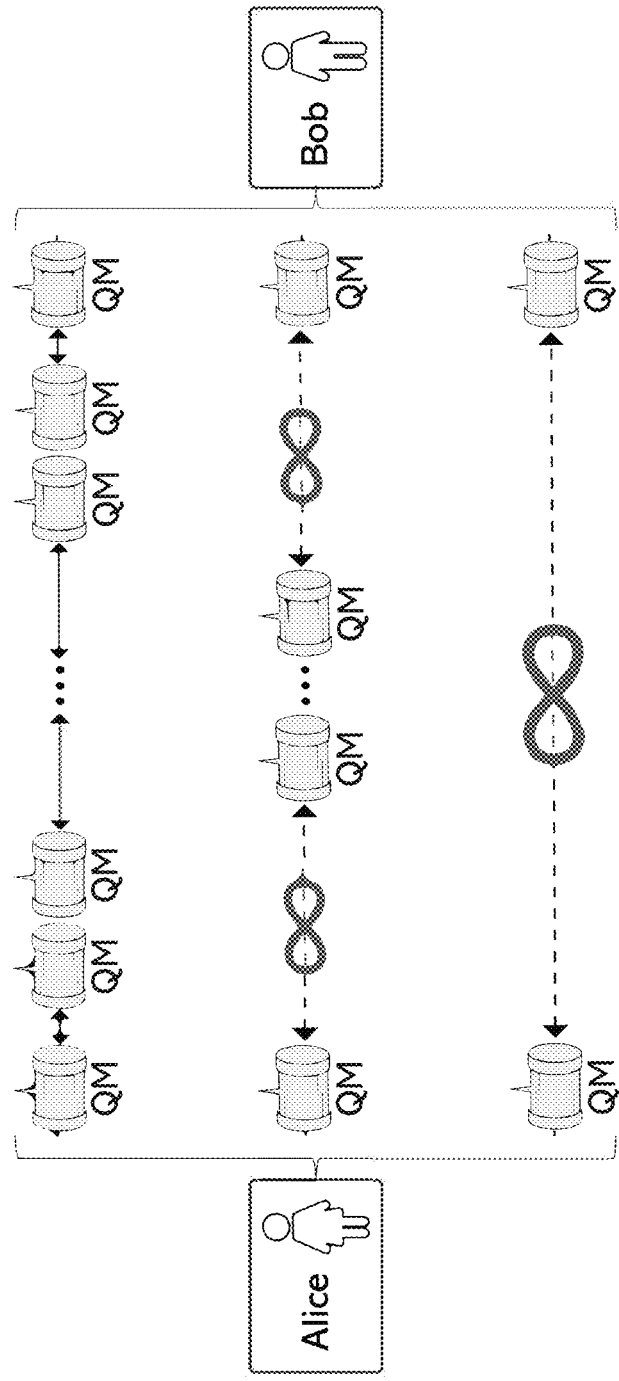
FIG. 12B is schematic diagram illustrating long-distance entanglement distribution such as, for example, with respect to the quantum network of FIG. 12A.

Additional quantum repeater nodes may be required for the quantum key to be reliably sent from first node 1202 to second node 1206, e.g., using quantum repeaters 1204(1), 1204(2), ... 1204(n) by performing entanglement swapping operations-pairwise until entanglement is established between first node 1202 and second node 1206, similarly as detailed above. More specifically, with respect to a chain of quantum repeaters 1204(1), 1204(2), ... 1204(n), disposed between first node 1202 to second node 1206, entangled pairs of photons are established in a concatenated manner and, thereafter, entanglement swapping between adjacent photons (not of the same pair) is accomplished. This is illustrated in FIG. 12B, which initially shows entanglement creation (top of FIG. 12B), followed by the first entanglement swap (middle of FIG. 12B) and, after any intermediate entanglement swaps, the last or $n^{th}$ entanglement swap (bottom of FIG. 12B) to teleport the quantum information from the first node to the second node. While entanglement swapping destroys the data integrity of the intermediate photons (involved in the intermediate swaps), the result is that the photons at first node 1202 and second node 1206 are entangled such to teleport the quantum information therebetween. As many quantum repeaters as necessary are provided and, thus, as many entanglement swaps as necessary are performed in order to enable transmission of the cryptographic key between first and second nodes 1202, 1206 which may be any distance apart. With respect to each quantum repeater, each photon of the two pairs of photons may be stored in a quantum memory device associated with that quantum repeater to enable temporal synchronization. Second node 1206 may ultimately receive the quantum key and convert the quantum key to the private cryptographic key for use in securing data transmission between first node 1202 and second node 1206.

In some examples, second node 1206 may transmit the cryptographic key to a computing device (e.g., computer, smartphone, IoT device) for use in securing a data transmission between first node 1202 and the computing device. Second node 1206 may transmit the cryptographic key to the computing device using a wireless connection (e.g., Wi-Fi, cellular network). Further, first node 1202 may establish a secure connection with second node 1206 and/or the computing device using the private cryptographic key and securely exchange data. The data may be securely exchanged over transmission channel segments 1208(1) to 1208(n) and/or alternative transmission channels that are separate from the transmission of the quantum key.

Figure 13A:
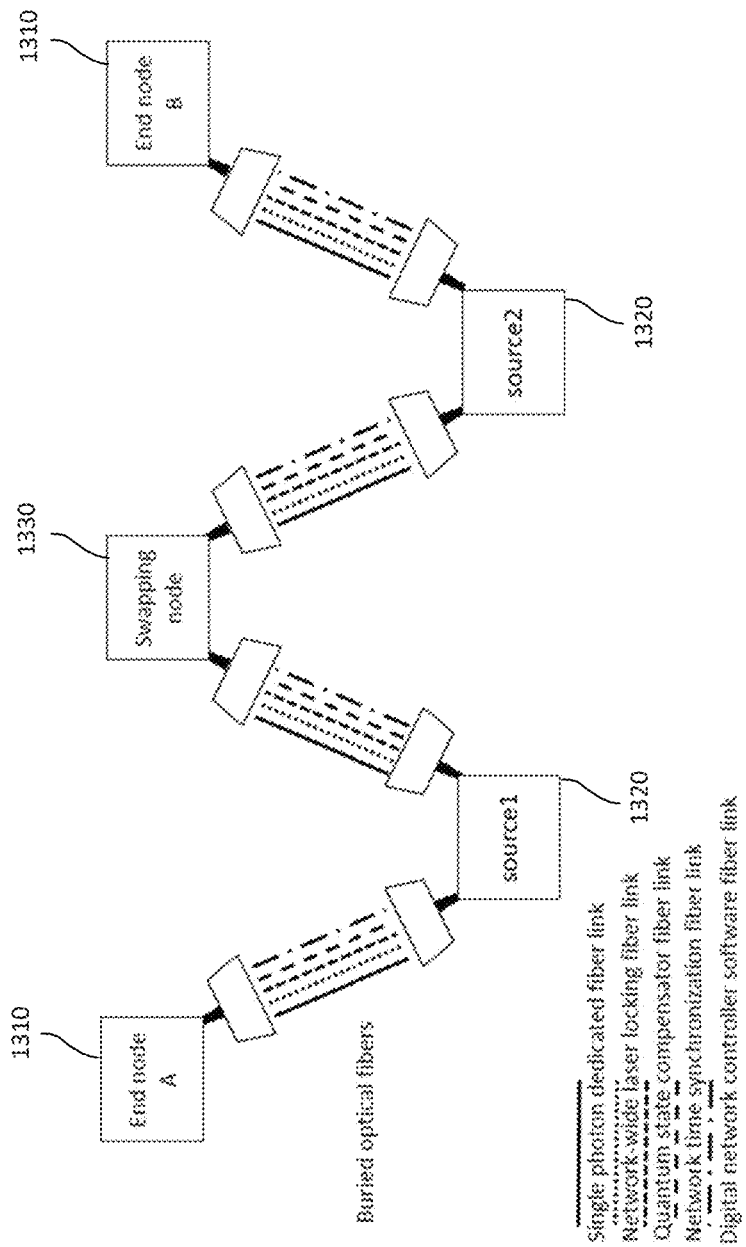
FIG. 13A is a schematic diagram illustrating the path of communication signals connecting a quantum communication network, in accordance with some embodiments described herein.

FIG. 13A is a schematic diagram showing the path of different communication signals connecting a network comprising two end nodes 1310, two source nodes 1320, and a swapping node 1330, in accordance with some embodiments described herein. The network shown in the example of FIG. 13A may be arranged like network 20 as illustrated in FIG. 2.

To provide communication between the end nodes, at least five different types of signals may be used between nodes to coordinate multi-device interfacing. In some embodiments, these signals may be transmitted by multiple optical fibers (e.g., separate optical fibers). Alternatively, these signals may be transmitted by a single optical fiber (e.g., via multiplexing). In such embodiments, a pair of photons may be originated at each source 1320, the pair then being transmitted to an end node 1310 and a swapping node 1330 though optical fiber links. Two separate signals may communicate frequency and time standards between the nodes, which are common to the overall network. Similarly, a third signal may be used for periodic calibration of the fiber channel through transmission of a quantum state reference signal. Lastly, a fourth signal coordinating the digital interface of these devices may be transmitted.

Figure 13B:
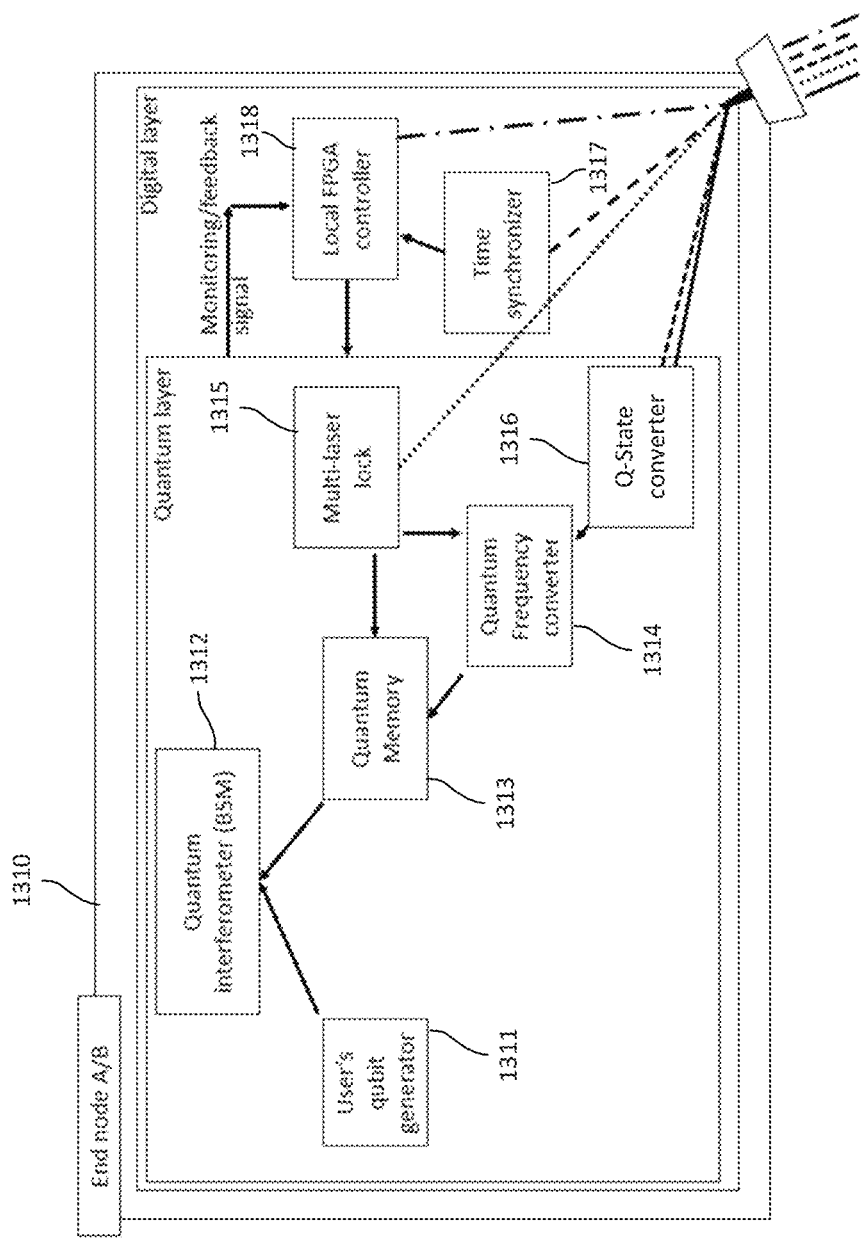
FIG. 13B is a schematic diagram illustrating components within a representative end node of FIG. 13A, in accordance with some embodiments described herein.

FIG. 13B is a schematic diagram illustrating components within a representative end node 1310 of FIG. 13A, in accordance with some embodiments described herein. The end node 1310 may include both quantum and digital layers. For example, the quantum layer may include a user's qubit generator 1311, a Bell-state-type measurement station 1312, a quantum memory 1313 (e.g., such as quantum memory 400 of FIG. 11), a quantum frequency converter 1314, a multi-frequency laser lock 1315, and/or a Q-state converter 1316. The quantum layer may be monitored and controlled by a digital layer. In some embodiments, the digital layer may include a time synchronizer 1317 and FPGA controller 1318.

Figure 13C:
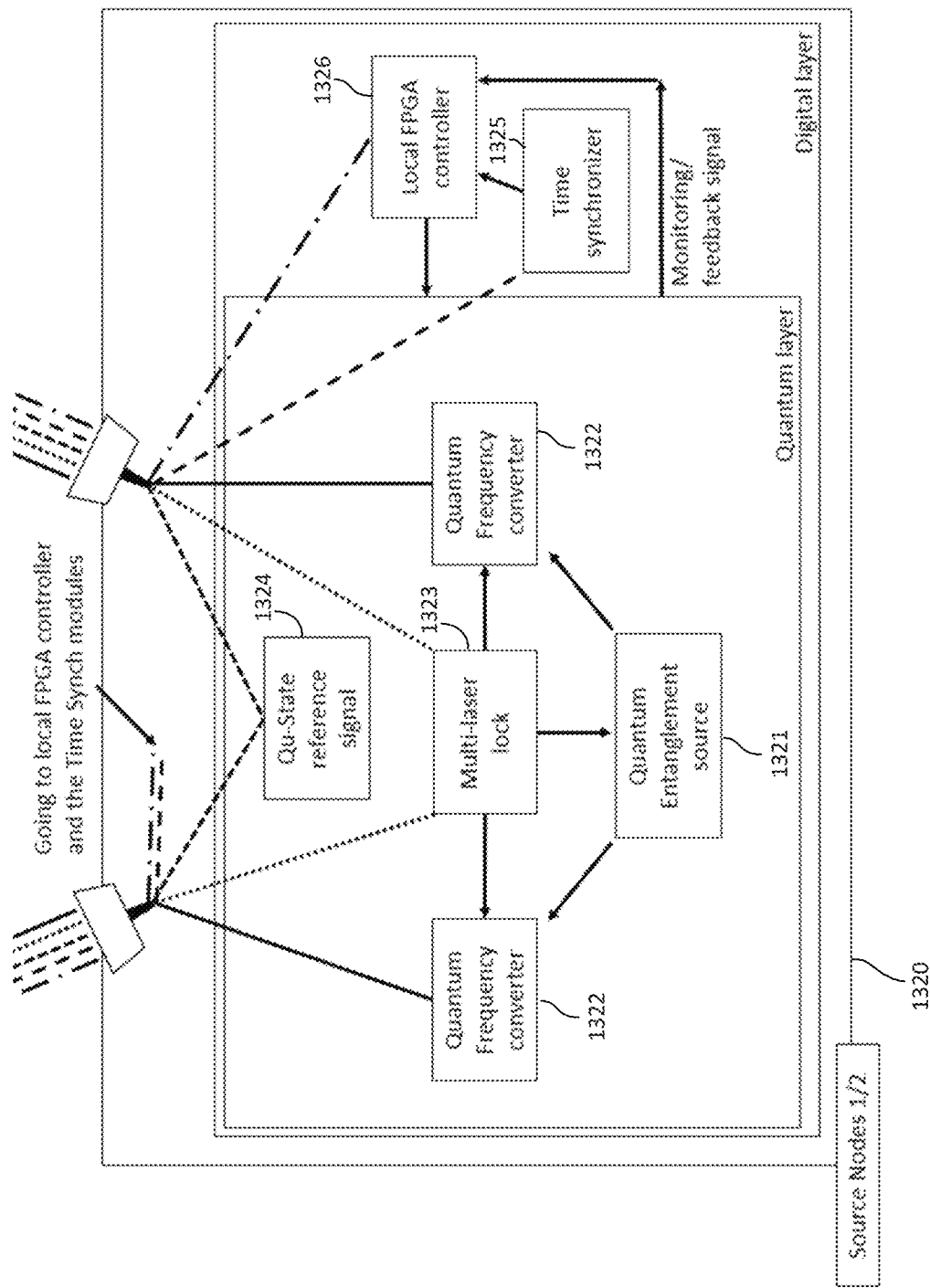
FIG. 13C is a schematic diagram detailing a representative source node of FIG. 13A, in accordance with some embodiments described herein.

FIG. 13C is a schematic diagram detailing a representative source node 1320, in accordance with some embodiments described herein. The quantum layer may include a quantum entanglement source 1321 configured to generate entangled photon pairs. These entangled photon pairs may then be transmitted through separate channels to separate quantum frequency converters 1322 to prepare the photons for transmission through the optical fibers connecting the nodes in the network of FIG. 13A. In some embodiments, a multi-laser lock 1323 may function as a frequency standard for the quantum entanglement source 1321 and the quantum frequency converters 1322. At a desired time, a Qu-state reference signal 1324 may be transmitted from the source node 1320 to adjacent nodes in the network to act as a channel calibration standard. In some embodiments, a trigger signal for the quantum entanglement source 1321 and Qu-State reference signal 1324 may be controlled by a time synchronizer 1325 in the digital layer of the source node 1320. A local FPGA controller 1326 disposed in the digital layer may be configured to monitor and control the quantum layer.

Figure 13D:
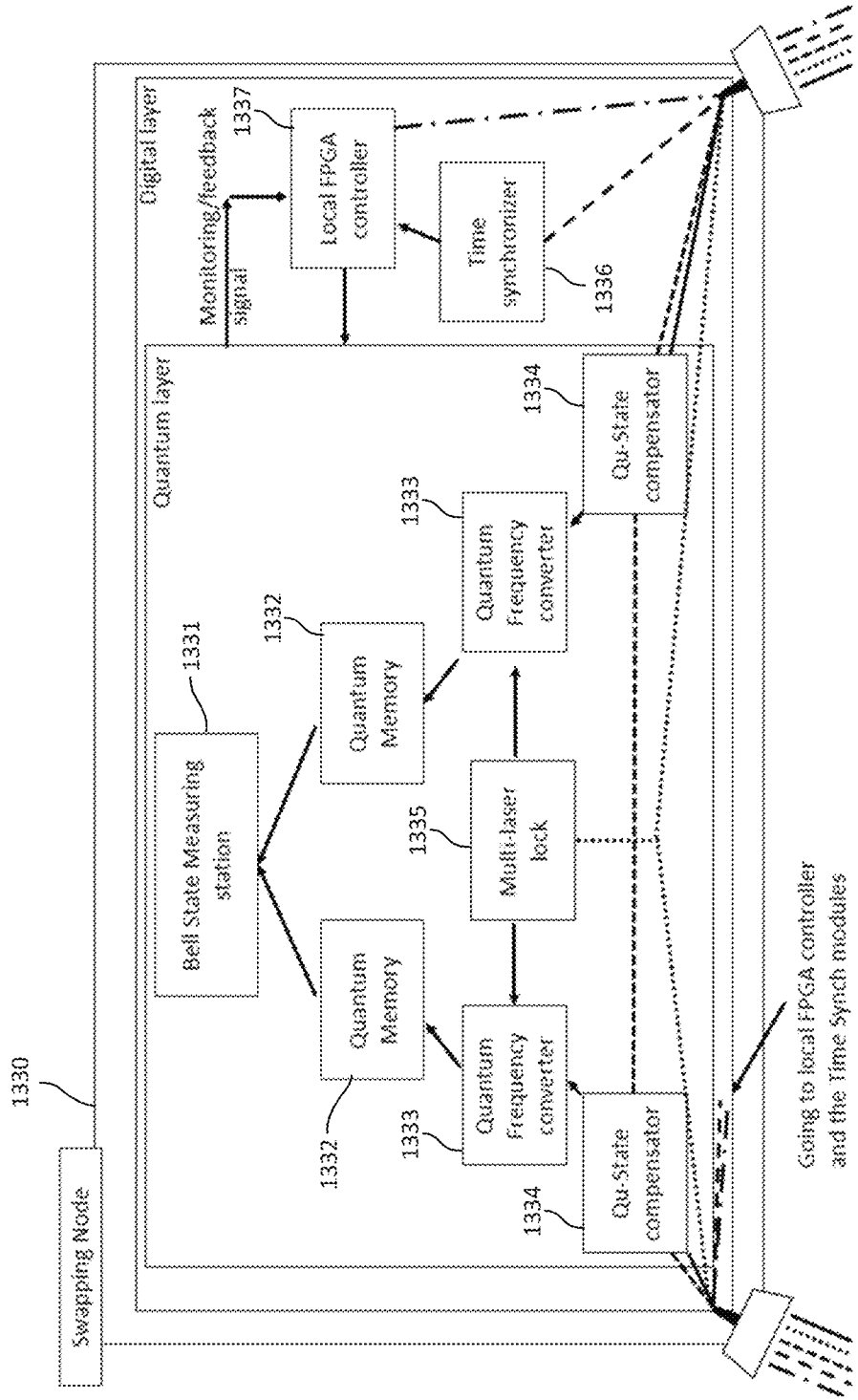
FIG. 13D is a schematic diagram detailing a representative swapping node of FIG. 13A, in accordance with some embodiments described herein.

FIG. 13D is a schematic diagram detailing a representative swapping node 1330 of the FIG. 13A, in accordance with some embodiments described herein. The quantum layer may include a Bell-state measuring station 1331, quantum memories 1332, quantum frequency converters 1333, and Qu-state compensators 1334. In some embodiments, an incoming photon may be first processed by a Qu-state compensator 1334 that are configured to correct the incoming signal based on a previously received calibration standard signal provided by the Qu-state reference signal 1324 from the source node 1320. The photon may then be transmitted to a quantum frequency converter 1333 that is configured to optimize the frequency of the photon for storage in the quantum memory 1332. Following frequency conversion, the photon may then be transmitted to the quantum memory 1332 for storage, awaiting a trigger signal for release. These processing steps may be replicated for each communication channel entering the swapping node 1330. In some embodiments, the digital layer may include a time synchronizer 1336 and a local FPGA controller 1337 to monitor and control the quantum layer. In some embodiments, at an appointed time, the digital layer may trigger the release of the photons stored in the quantum memories 1332 such that the photons are transmitted to the Bell-state measurement station 1331 that is configured to perform an interference measurement using the received photons.

Persons skilled in the art will understand that the features specifically described hereinabove and shown in the associated figures are non-limiting exemplary embodiments, and that the description, disclosure, and figures should be construed merely as exemplary of particular embodiments. Therefore, it is to be understood that the present disclosure is not limited to the precise embodiments described, and that various other changes and modifications may be made by one skilled in the art without departing from the scope or spirit of the disclosure.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

What is claimed is:

1. A method of checking a quantum network using a coherent light source, the method comprising:
   measuring a classical first-order interference between two temporally synchronized photon pulses received from separate sources, wherein each pulse includes, on average, a plurality of photons;
   determining a first interference visibility based on the measured classical first order interference; and
   determining whether the first interference visibility is above a first threshold; and
   responsive to determining the first interference visibility is above the first threshold:
      measuring a HOM interference between two temporally synchronized photon pulses received from separate sources, wherein each pulse includes, on average, one photon or less;
      determining a second interference visibility based on the measured HOM interference; and
      determining whether the second interference visibility is above a second threshold.

2. The method according to claim 1, further comprising:
in response to determining that the first interference visibility is not above the first threshold, providing a negative indication;
in response to determining that the second interference visibility is not above the second threshold, providing a negative indication; and
in response to determining that both the first and second interference visibilities are above the respective first and second thresholds, providing a positive indication.

3. The method according to claim 2, wherein the first threshold is at least 95% and the second threshold is at least 40%.

\* \* \* \* \*